United States Patent [19]

Muramatsu

[11] Patent Number: 5,173,785
[45] Date of Patent: Dec. 22, 1992

[54] IMAGE FORMING APPARATUS

[75] Inventor: Hideo Muramatsu, Osaka, Japan

[73] Assignee: Minolta Camera Co., Ltd., Osaka, Japan

[21] Appl. No.: 453,621

[22] Filed: Dec. 20, 1989

[30] Foreign Application Priority Data

Dec. 21, 1988 [JP] Japan ............................... 63-322805
Dec. 21, 1988 [JP] Japan ............................... 63-322806
Dec. 21, 1988 [JP] Japan ............................... 63-322807
Apr. 11, 1989 [JP] Japan ............................... 1-91672

[51] Int. Cl.$^5$ ..................... H04N 1/00; G03G 21/00; B65H 31/04
[52] U.S. Cl. .................................. 358/400; 358/498; 355/308; 355/321; 271/213
[58] Field of Search ............... 358/498, 474, 400, 476, 358/401; 355/323, 308, 321; 271/207, 213

[56] References Cited

U.S. PATENT DOCUMENTS

| 4,318,539 | 3/1982 | Lamos ................... 270/58 |
| 4,354,787 | 10/1982 | Gensike et al. ......... 414/54 |
| 4,669,717 | 6/1987 | Yamashita et al. ...... 271/213 |
| 4,735,408 | 4/1988 | Yamashita et al. ...... 271/213 |
| 4,989,853 | 2/1991 | Matysek et al. ........ 271/213 |
| 4,995,602 | 2/1991 | Nakadai et al. ........ 271/207 |
| 5,007,625 | 4/1991 | Kremers et al. ........ 271/213 |

FOREIGN PATENT DOCUMENTS

| 57-4656 | 1/1982 | Japan .................... 358/498 |
| 60-187172 | 9/1985 | Japan .................... 358/498 |
| 60-45103 | 10/1985 | Japan . |
| 62-171263 | 7/1987 | Japan . |
| 63-163376 | 7/1988 | Japan . |

OTHER PUBLICATIONS

IBM Technical Disclosure Bulletin; Manning et al., "Sheet Stacking Technique", vol. 17, No. 8, Jan. 1975, p. 2255.

Primary Examiner—Edward L. Coles, Sr.
Assistant Examiner—Thomas D. Lee
Attorney, Agent, or Firm—Willian Brinks Olds Hofer Gilson & Lione

[57] ABSTRACT

A facsimile apparatus comprises a paper discharge tray for storing original documents having been read and image-carrying recording paper. The tray is shiftable by a switching mechanism between a plurality of position for selectively receiving the documents and recording paper. The switching mechanism is operable in response to each operation for reading a series of original documents or recording a series of images on the recording paper, so that the documents and recording paper are sorted according to respective sets on the discharge tray.

22 Claims, 24 Drawing Sheets

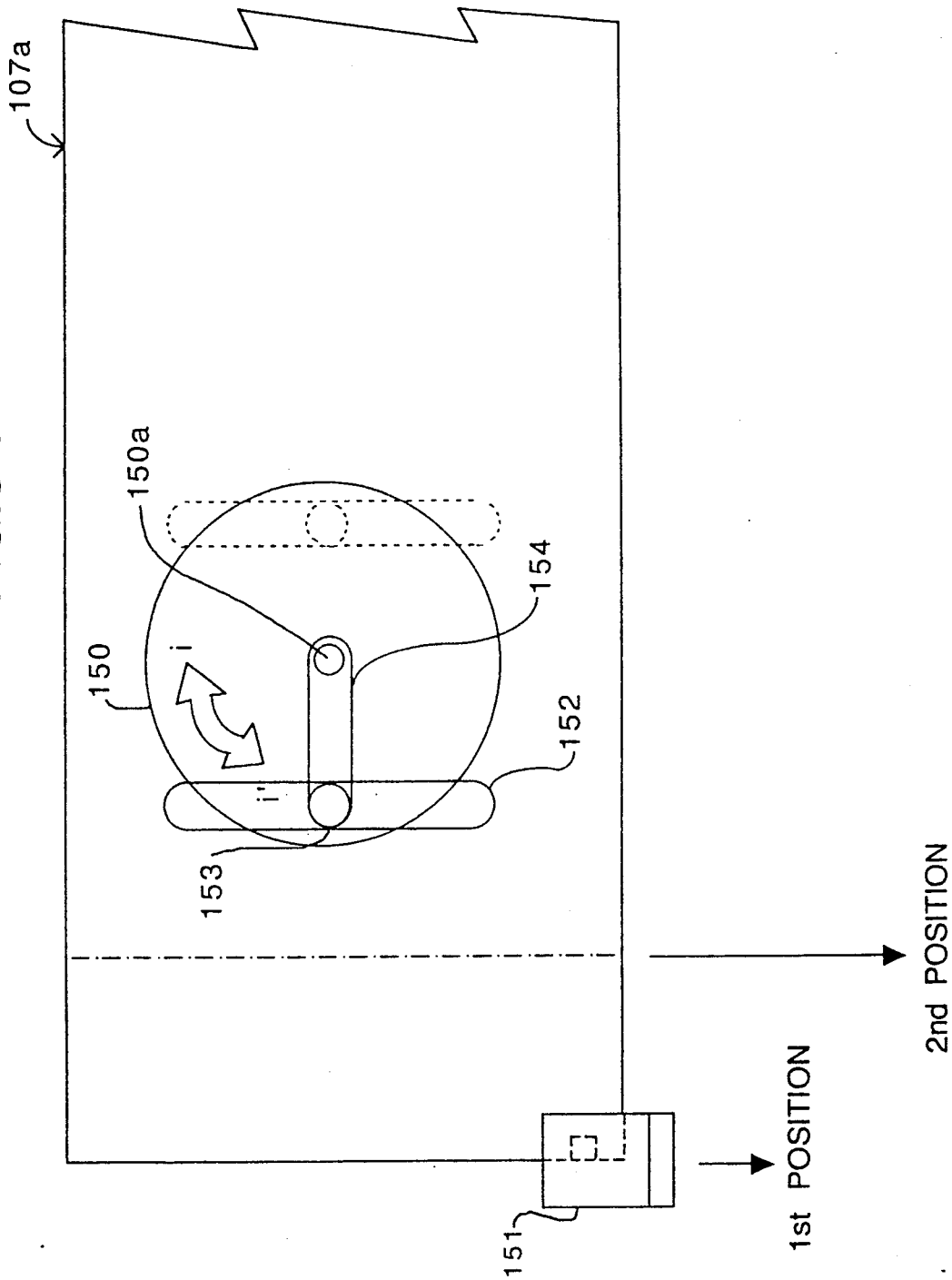

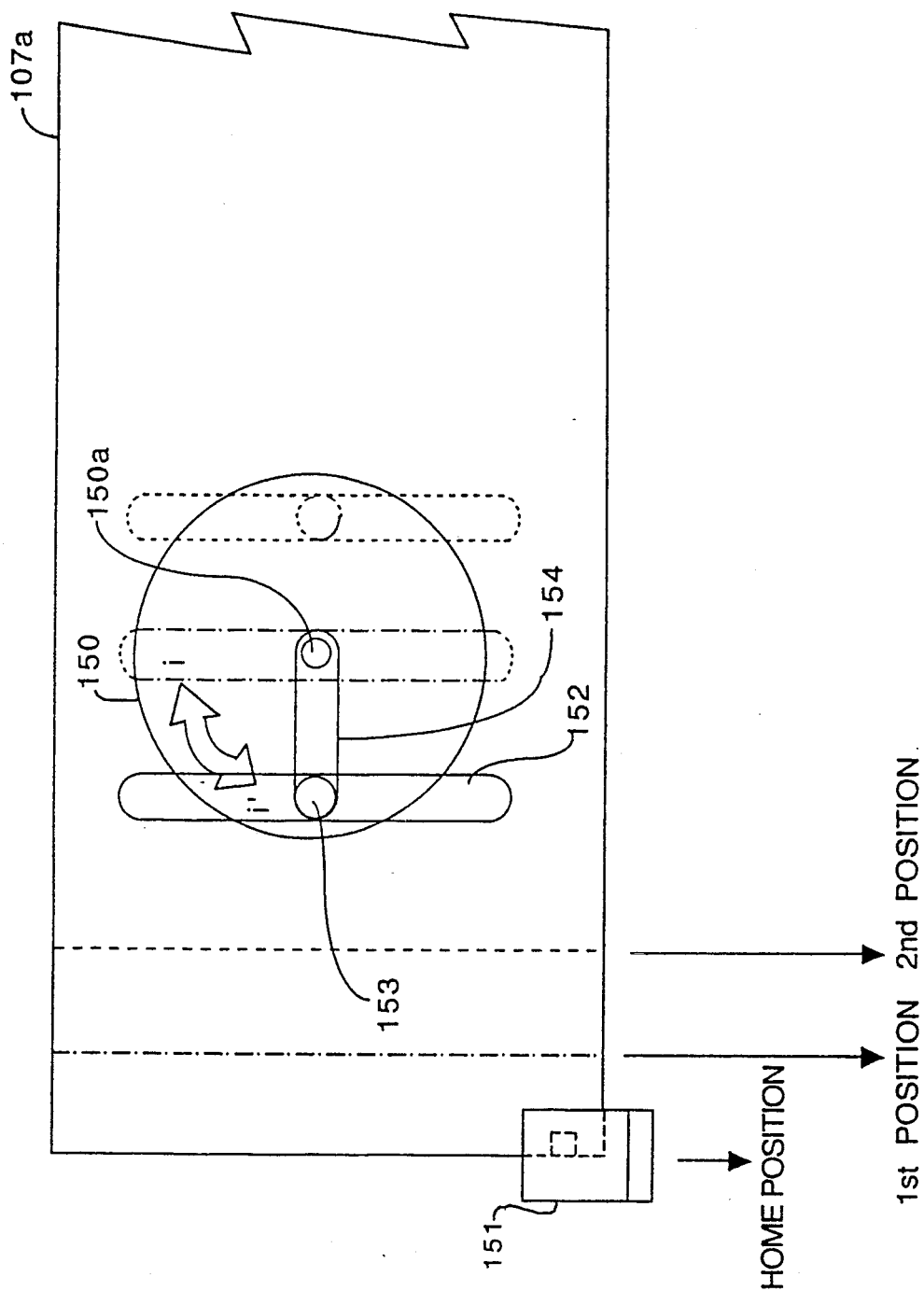

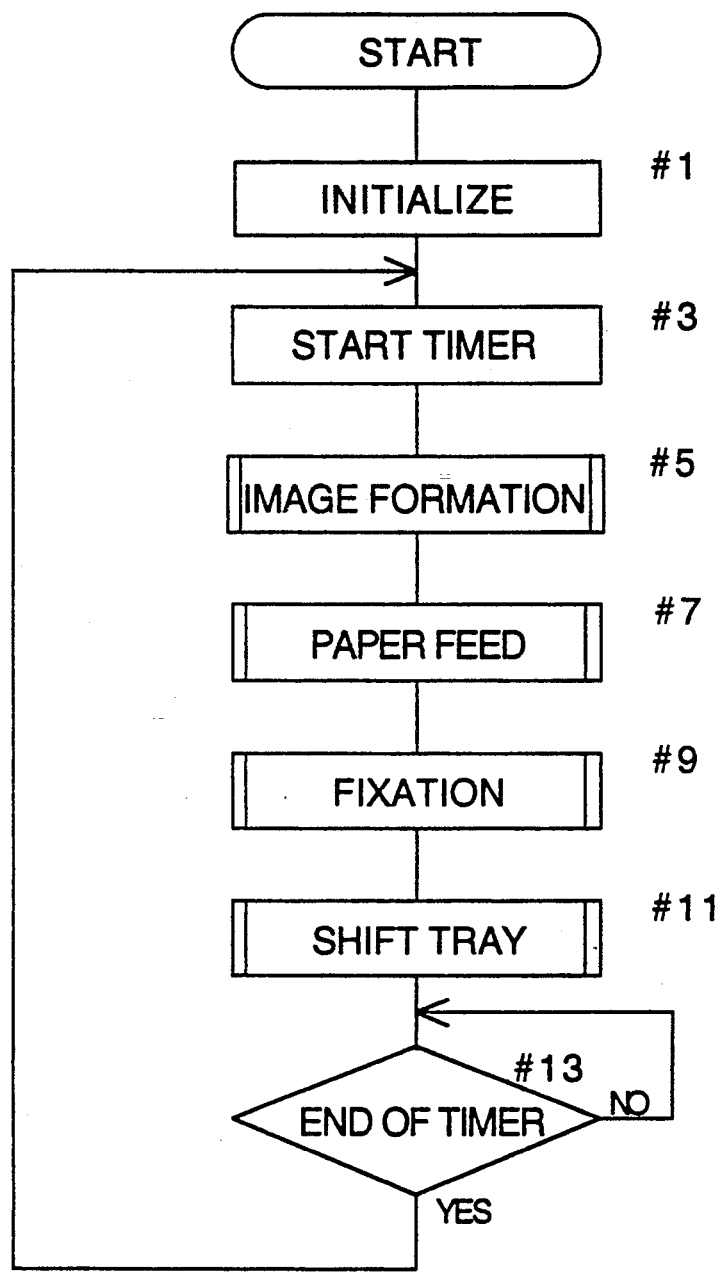

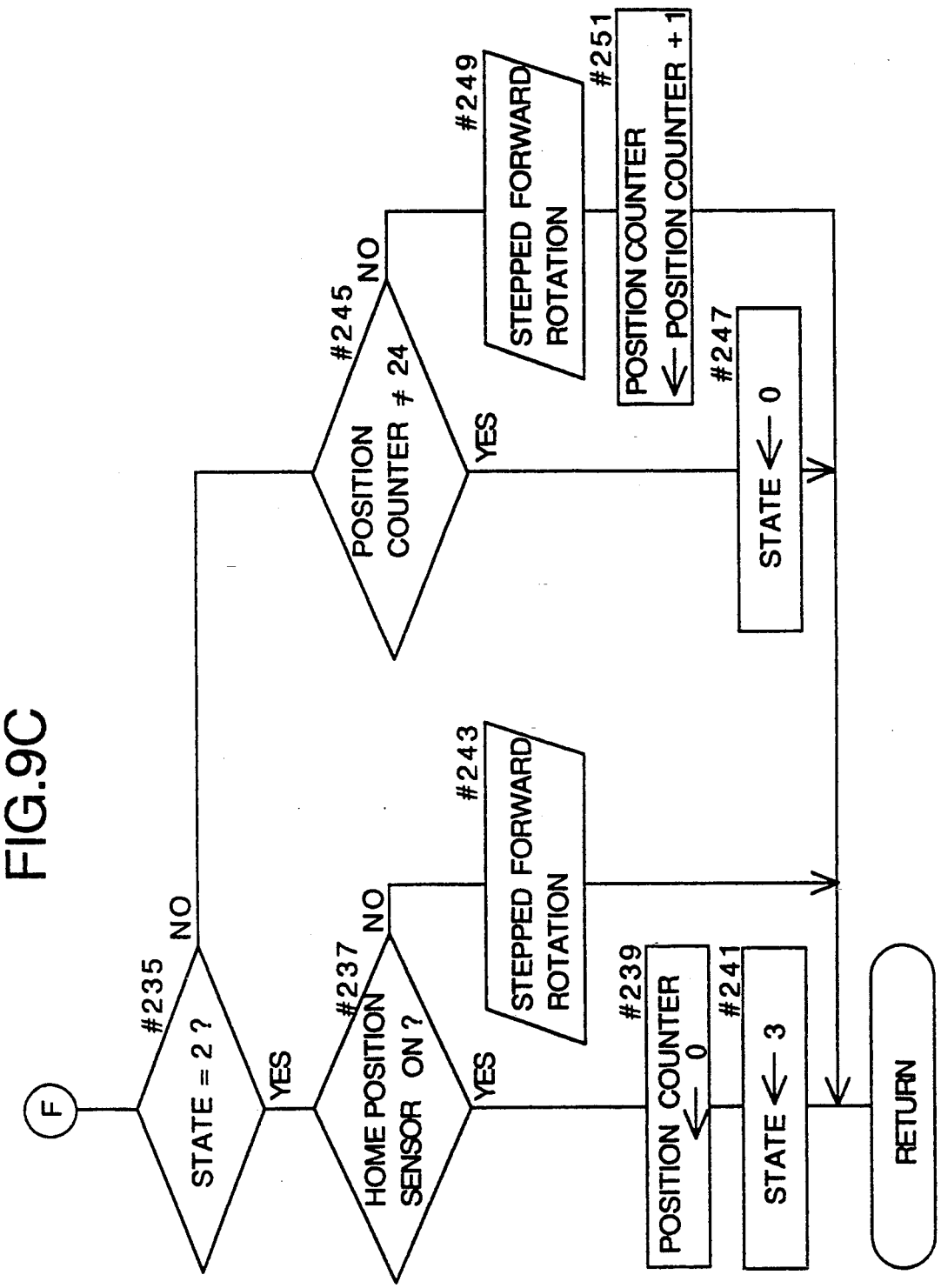

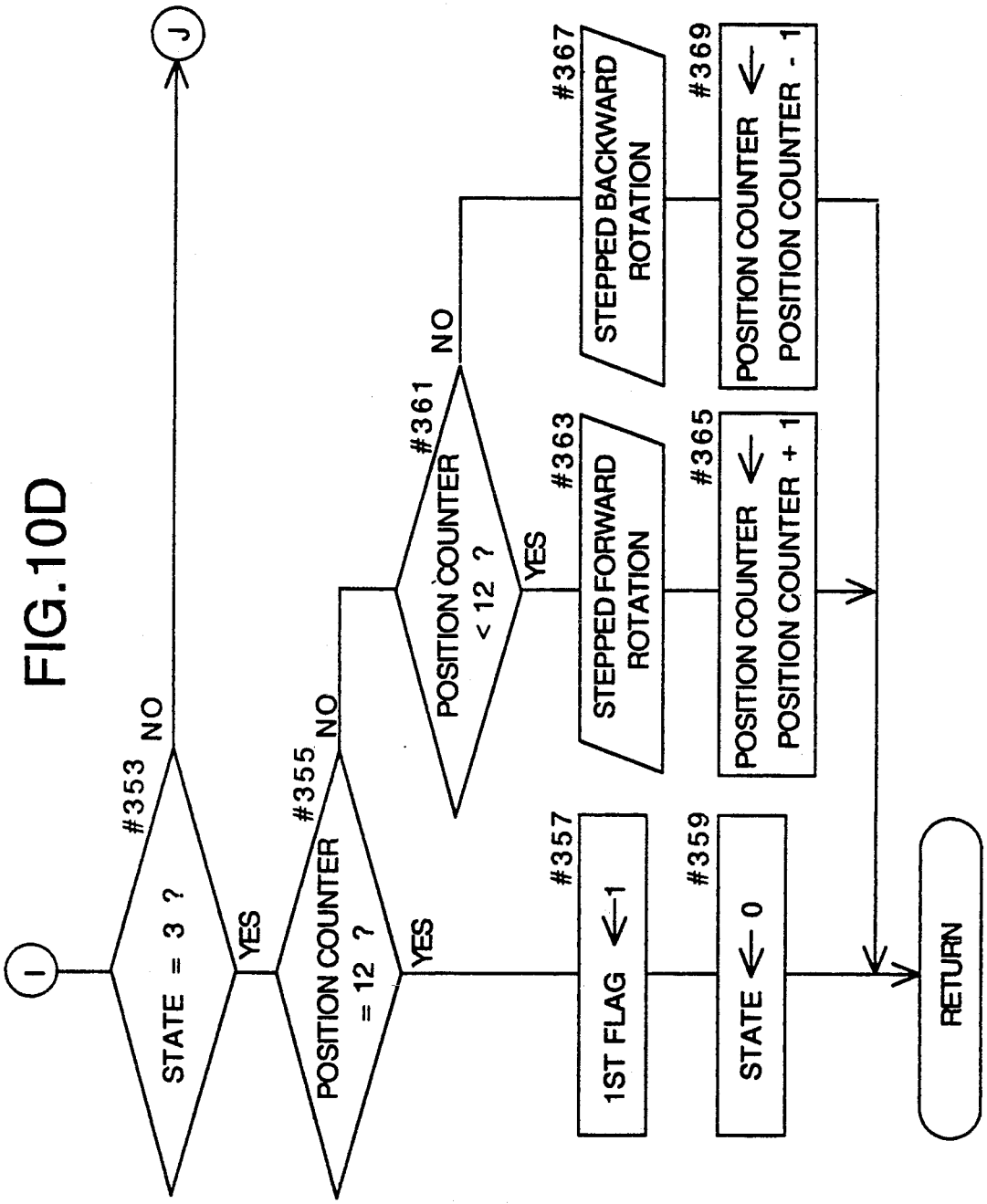

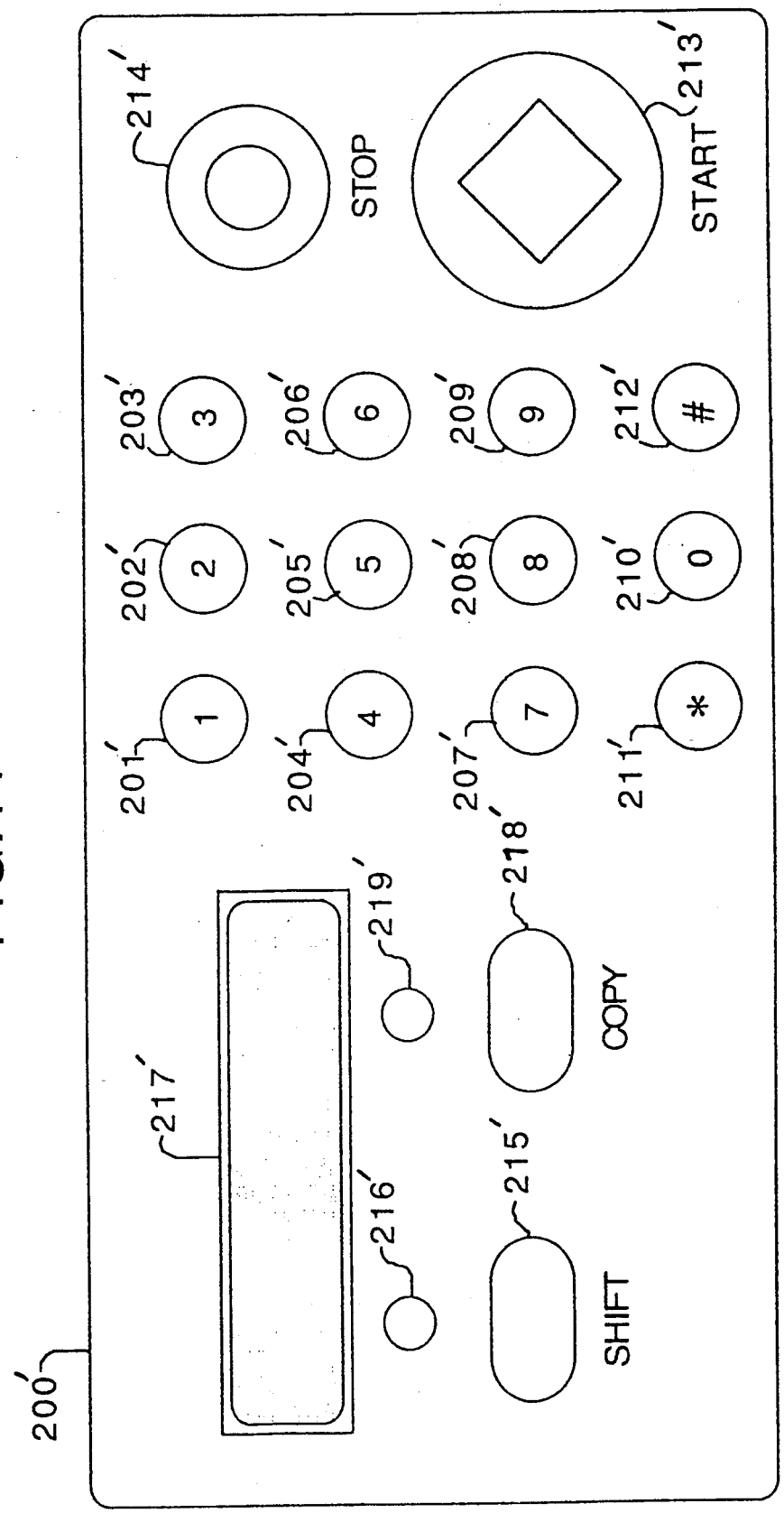

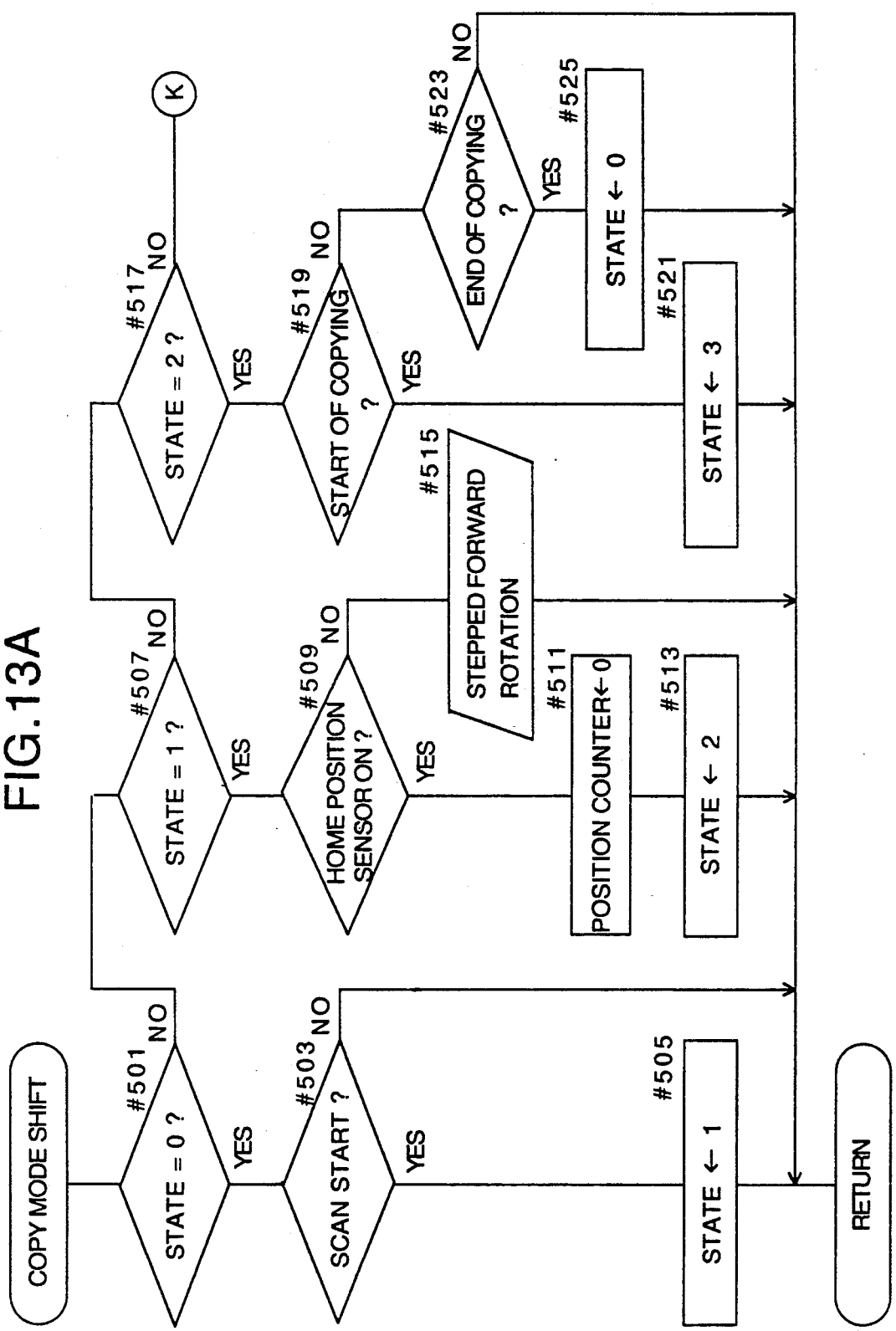

FIG.14

| | | | | | | | | | | | | |
|---|---|---|---|---|---|---|---|---|---|---|---|---|
| D1 → | M1 → | C1 | C1 | C1 | C1 | C1 | C1 | C1 | C1 | C1 | C1 | |
| D2 → | M2 → | C2 | C2 | C2 | C2 | C2 | C2 | C2 | C2 | C2 | C2 | |
| D3 → | M3 → | C3 | C3 | C3 | C3 | C3 | C3 | C3 | C3 | C3 | C3 | |
| . → | . → | . | . | . | . | . | . | . | . | . | . | |
| . → | . → | . | . | . | . | . | . | . | . | . | . | |
| . → | . → | . | . | . | . | . | . | . | . | . | . | |
| D10 → | M10 → | C10 | C10 | C10 | C10 | C10 | C10 | C10 | C10 | C10 | C10 | |
| | | ⇧ | ⇧ | ⇧ | ⇧ | ⇧ | ⇧ | ⇧ | ⇧ | ⇧ | ⇧ | |
| | | 2nd POSITION S1 | 1st POSITION S2 | 2nd POSITION S3 | 1st POSITION S4 | 2nd POSITION S5 | 1st POSITION S6 | 2nd POSITION S7 | 1st POSITION S8 | 2nd POSITION S9 | 1st POSITION S10 | |
| | | ① | ② | ③ | ④ | ⑤ | ⑥ | ⑦ | ⑧ | ⑨ | ⑩ | |

IMAGE FORMING APPARATUS

BACKGROUND OF THE INVENTION (1) Field of the Invention

The present invention relates to image forming apparatus, and more particularly to a facsimile machine which stores, on a common storage device, documents whose image information has been read for transmission and recording paper carrying image information received through a communication line.

(2) Description of the Prior Art

With a known facsimile machine as noted above, the documents and recording paper are collected from the storage device each time they are placed thereon. A plurality of documents and recording paper will remain mixed on the storage device if they are left uncollected for a long time This necessitates a manual sorting operation after collecting such documents and recording paper.

SUMMARY OF THE INVENTION

An object of the present invention is to provide a facsimile machine which automatically sorts out documents and recording paper, thereby eliminating the necessity for a manual sorting operation even when the documents and recording paper are left uncollected from a common storage device.

The above object is fulfilled, according to the present invention, by a facsimile apparatus comprising a common storage device for storing original documents having been read by an image reader and recording paper having been recorded by an image recording device. The common storage device is switchable between a plurality of positions, whereby the documents are sorted from the recording paper, and the recording paper is sorted according to respective sets, both within the common storage device.

According to the present invention, therefore, one common storage device is sufficient for receiving the original documents and recording paper, instead of providing two storage devices. This feature realizes a facsimile apparatus of simple construction and low cost, and eliminates the troublesome operation for manually sorting the documents and recording paper despite the shared use of the storage device.

The foregoing and other objects, features and advantages of the invention will be apparent from the following more particular description of preferred embodiments of the invention, as illustrated in the accompanying drawings

BRIEF DESCRIPTION OF THE DRAWINGS

FIGS. 3A and 3B are an explanatory views of a mechanism for shifting the discharge tray, FIG. 7 is a flowchart showing an operation of the CPU for controlling the image recording section, FIGS. 10A through 10E are a flowchart of a further modification of the shift tray subroutine, FIG. 11 is an explanatory view of a control panel of a second embodiment of the invention, FIGS. 13A and 13B are a flowchart of a shift tray subroutine executed in a copy mode in FIG. 12, and FIG. 14 is an explanatory view showing sorting of plural sets of copies taken of a series of documents.

DETAILED DESCRIPTION OF THE PREFERRED EMBODIMENTS

Figure 1:
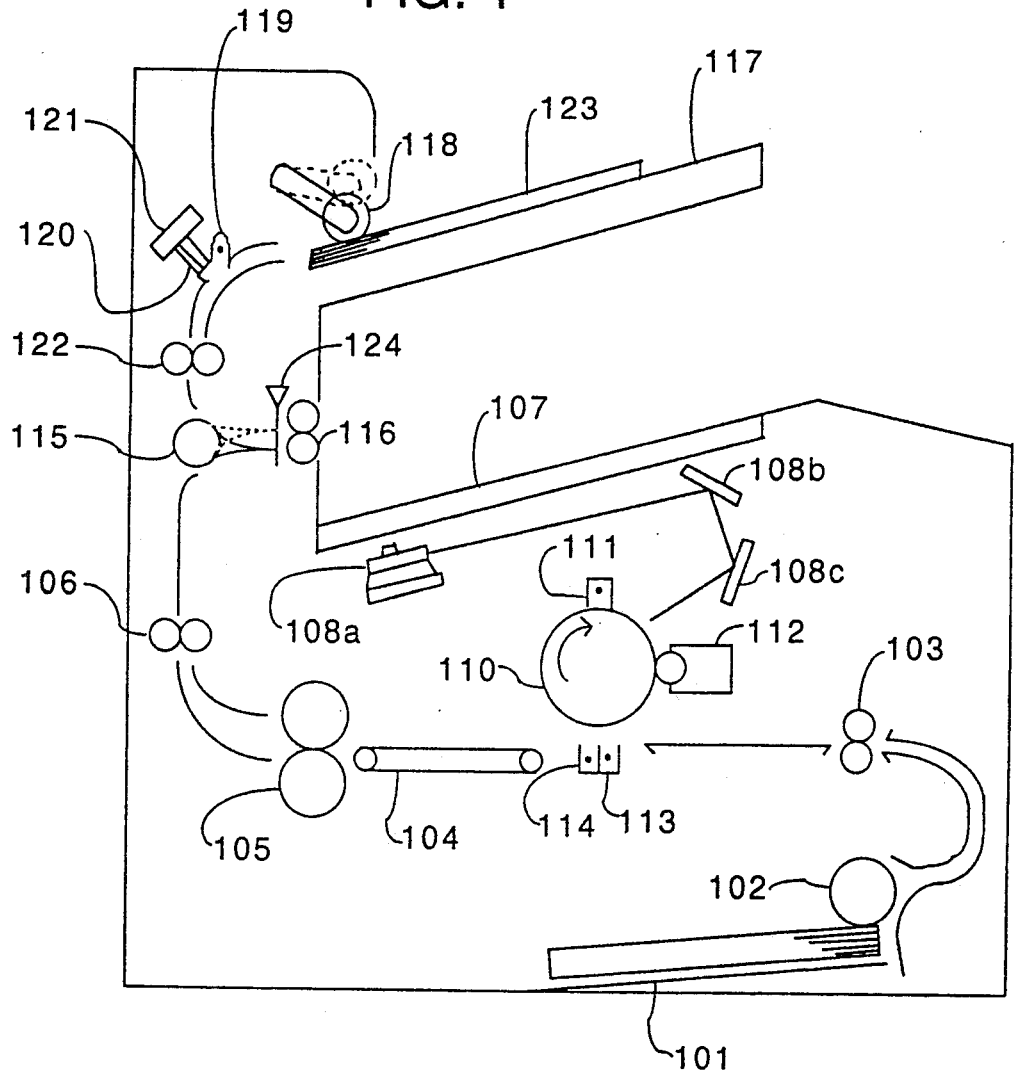
FIG. 1 is a schematic sectional view of a facsimile machine according to a first embodiment of the present invention.

A facsimile machine according to a first embodiment of the present invention will be described hereinafter.

This facsimile machine comprises a document scanning section disposed upwardly and an image recording section disposed downwardly. Documents whose information has been transmitted and recording paper carrying information received are discharged onto a discharge tray 107 disposed at a vertically intermediate position.

Document Scanning Section

The document scanning section includes a document tray 117, a feed roller 118 for feeding documents one after another from the document tray 117, an exposure lamp 119 for exposing the documents, an image sensor 121 having a selfock lens array 120 for scanning document images and converting them into electric signals, document transport rollers 122 for transporting the documents after the scanning operation, a switching pawl 115 for switching passages for the documents and recording paper (between a position shown in a solid line for discharging the documents and a position shown in a broken line for discharging recording paper), a discharged paper detecting sensor 124 for detecting discharge of the documents and recording paper, a discharge roller pair 116 for discharging the documents and recording paper.

Image Recording Section

The image recording section includes a photoreceptor drum 110 rotatable in the direction indicated by an arrow in FIG. 1, a laser device (including a semiconductor laser and a polygon mirror) 108a for emitting a laser beam corresponding to an image data, reflecting mirrors 108b and 108c for reflecting the laser beam to the drum 110, a corona charger 111 for charging the drum 110 prior to exposure to he laser beam, a developing device 112 for developing with toner an electrostatic latent image formed by the laser beam on the photoreceptor drum 110, a paper supply cassette 101 for storing the recording paper, a feed roller 102 for feeding the recording paper from the cassette 101, a timing roller pair 103 for feeding the recording paper with appropriate timing to a position between the photoreceptor drum 110 and a transfer charger 113 for transferring the toner image from the drum 110 to the recording paper, a separating charger 114 for separating the recording paper from the drum 110 after the image transfer, a conveyer belt 104 for transporting the separated recording paper, a fixing roller pair 105, and a transport roller pair 106.

Figure 2:
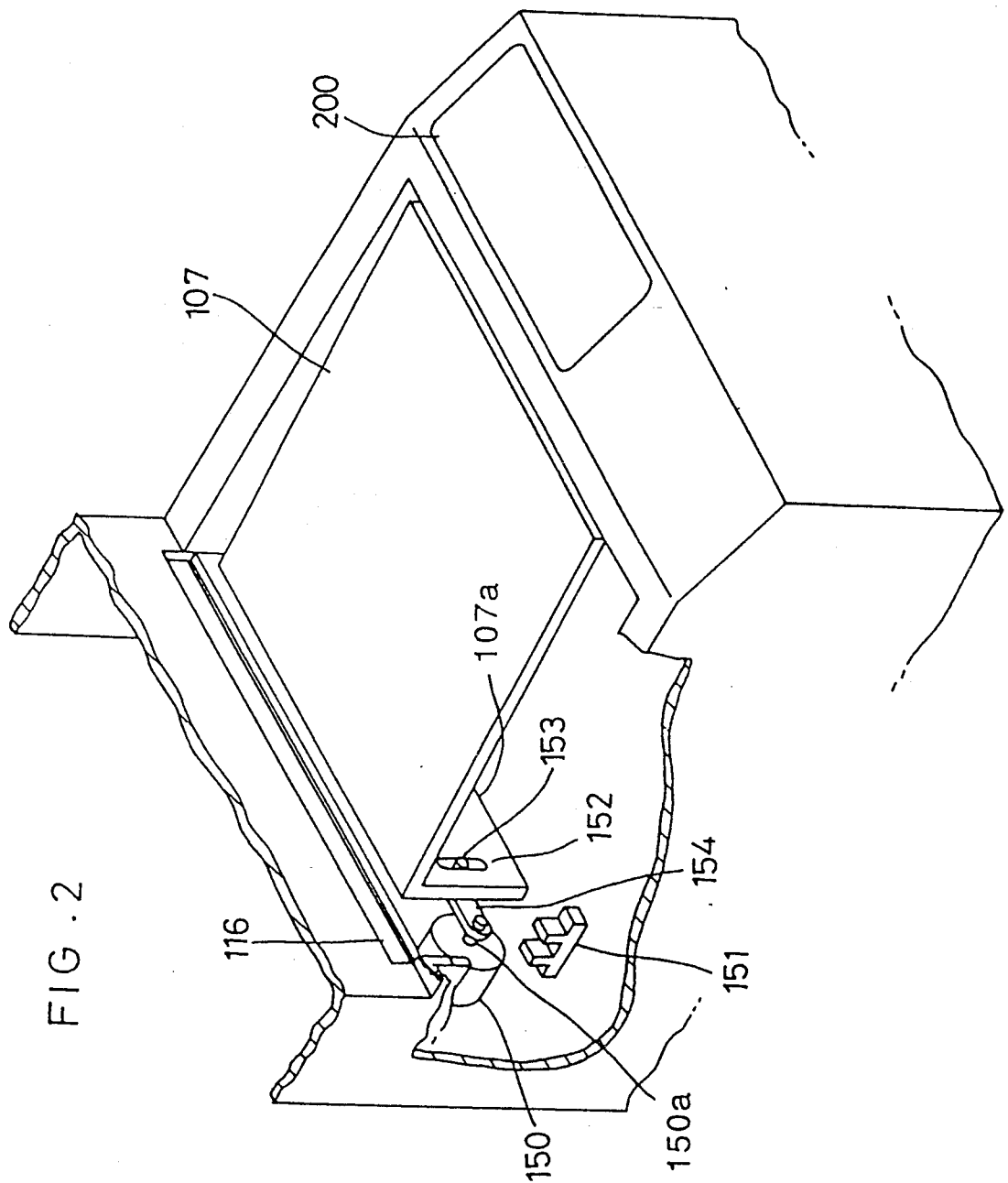
FIG. 2 is a fragmentary perspective view of a discharge tray and adjacent components.

FIG. 2 is a fragmentary perspective view of the paper discharge tray 107 and adjacent components. FIGS. 3A and SB are explanatory views showing the principle of shifting the tray 107.

The discharge tray 107 is movable between an upper righthand position and a lower lefthand position in FIG. 2. The documents and recording paper are sorted out according to communications by moving the tray from one of the above positions to the other immediately before discharge of a first sheet used in each communication (outgoing or incoming).

As shown, a stepper motor 150 has an output shaft 150a fixedly carrying one end of an elongate plate element 154. The other end of the plate element 154 includes a projection 153.

The discharge tray 107 includes a downward extension 107a depending from an end thereof opposed to the main body of the facsimile machine. This extension 107a defines a slot 152 extending vertically adjacent one side (the lefthand side in FIGS. 3A) for receiving the projection 153.

When the stepper motor 150 is driven to rotate the output shaft 150a, the projection 153 makes a movement describing an arc (referenced i, i' in FIG. 3A) around the output shaft 150a. This movement of the projection 153 applies a pressing force to inside walls of the slot 152. As a result, the extension 107a (and therefore the discharge tray 107) is moved by the pressing force right and left in FIG. 3A. The discharge tray 107 may be adapted switchable among three positions as shown in FIG. 3B.

In this embodiment, the discharge tray 107 is movable between two positions, with the slot 152 reciprocating between a position shown in a solid line and a position shown in a broken line in FIG. 3A. The former position corresponds to the lower lefthand position of the discharge tray 107 in FIG. 2. In this position, a home position sensor 151 detects the extension 107a of the discharge tray 107 and is turned on, while a position counter described later is reset to zero. The latter position corresponds to the upper righthand position of the discharge tray 107 in FIG. 2. In this position, the home position sensor 151 is turned off, while the position counter described later is set to "24".

Reference numeral 200 in FIG. 2 denotes a control panel of this facsimile machine.

Control Panel

Figure 4:
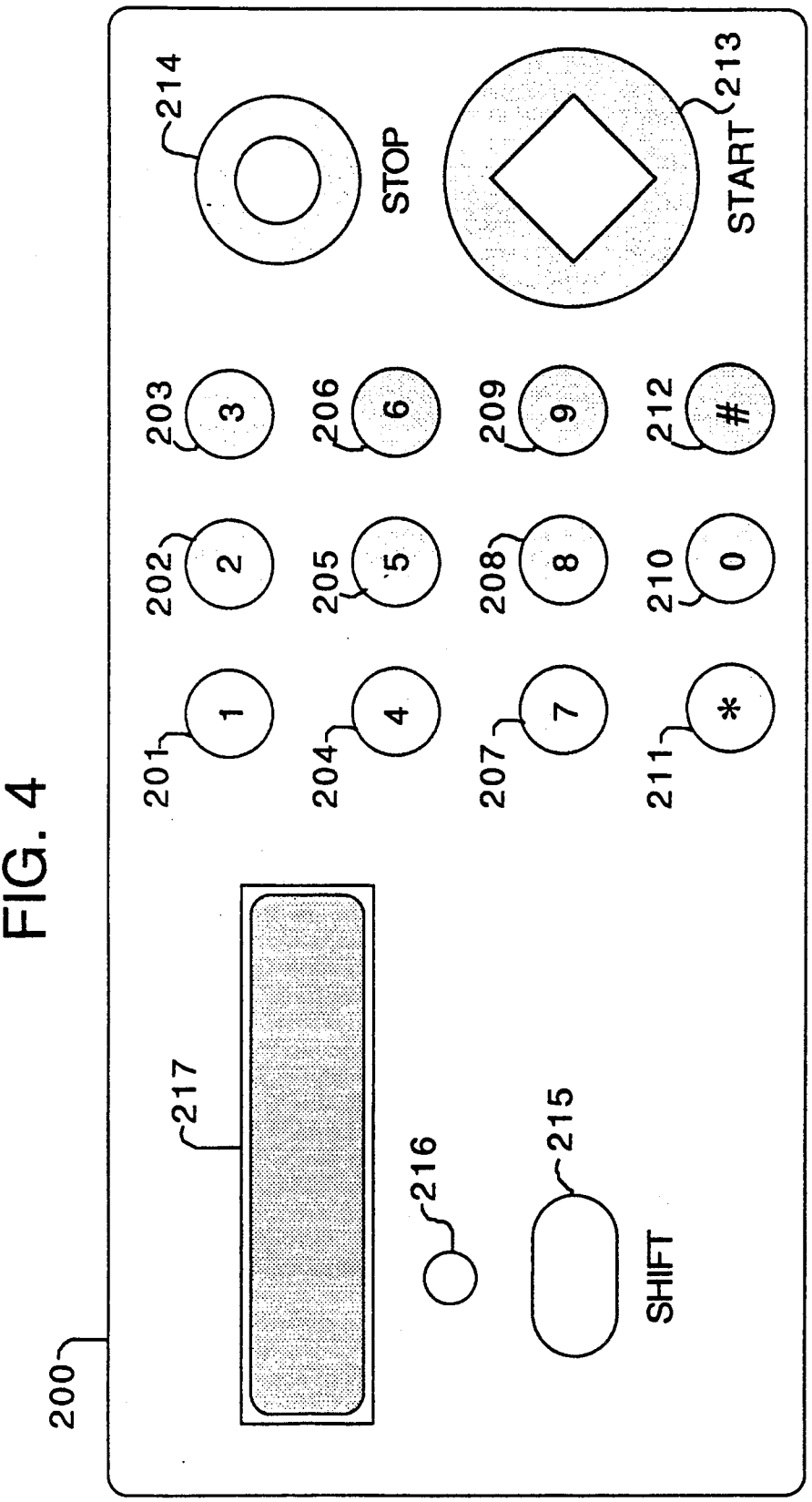
FIG. 4 is an explanatory view of a control panel of the facsimile machine.

FIG. 4 is an explanatory view of the control panel in this embodiment.

As shown, the control panel 200 includes a group of numeric keys 201-210 for designating the number of a facsimile machine to be called, function keys 211 and 212 for adding various functions in combination with other keys, a start key 213 for starting an image transmission, a stop key 214 for discontinuing an image transmission, a shift key 215 for setting and canceling a mode (shift mode) for shifting the discharge tray, a shift indicator 216 which is lit for indicating that the shift mode is selected, and a liquid crystal display 217 for displaying an operating sequence of this facsimile machine.

Figure 5:
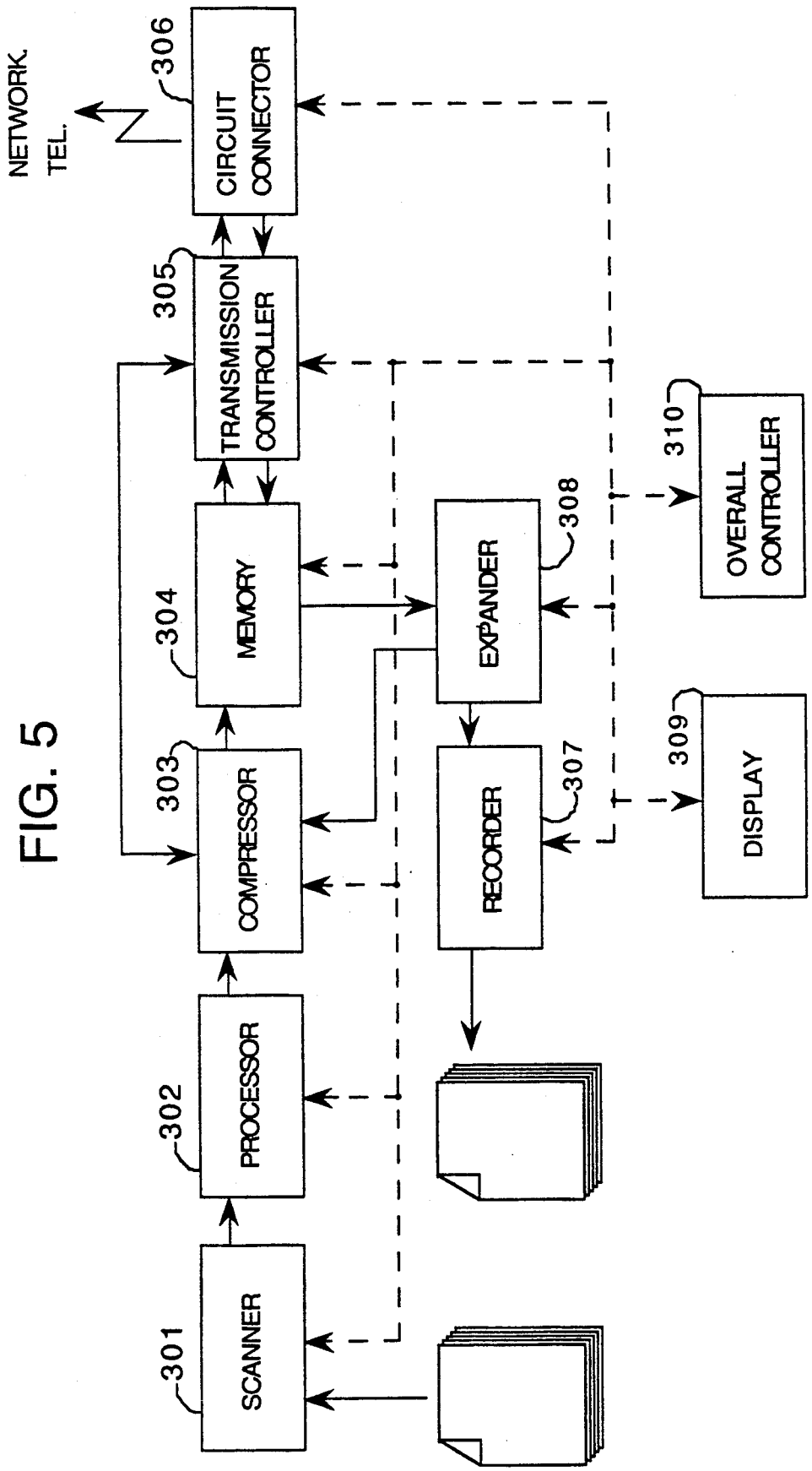
FIG. 5 is a block diagram of a control circuit of the facsimile machine.
Figure 6:
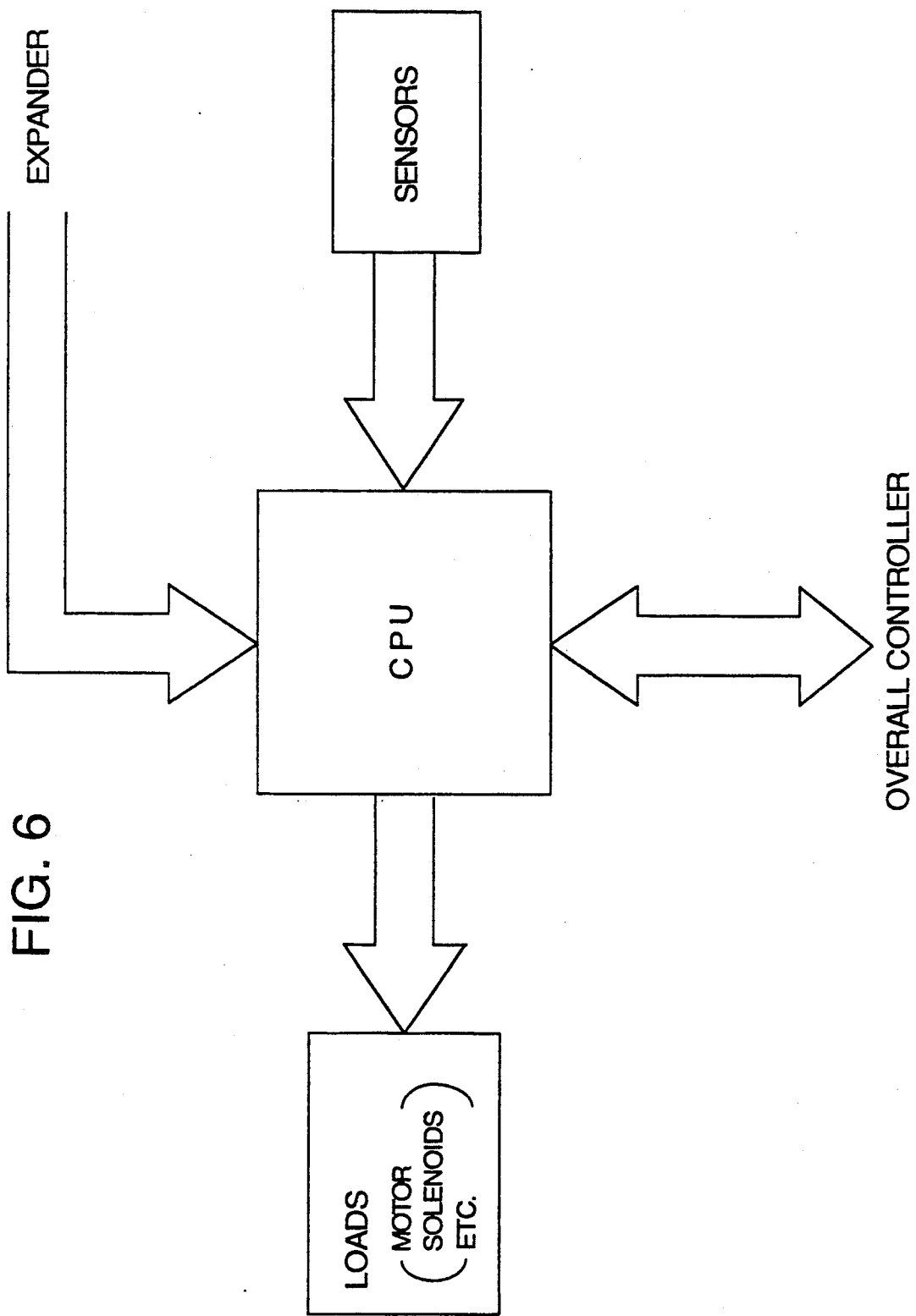
FIG. 6 is an explanatory view of input and output signals of a CPU for controlling an image recording section of the facsimile machine.

FIG. 5 is a block diagram of a control circuit of the facsimile machine. FIG. 6 is an explanatory view showing how signals are input to and output from a CPU of a recorder 307 shown in FIG. 5.

The illustrated control circuit, includes a scanner 301, a processor 302, a compressor 303, a memory 304, a transmission controller 305, a circuit connector 306, an expander 308, a recorder 307, a control display unit 309, and an overall controller 310.

The scanner 301 controls the operation of the image scanning section (including scanning of original documents, adjustment and turning on and off of the exposure lamp, driving of the image sensor, transport of the documents and so on).

The processor 302 carries out predetermined processing of an image signal (analog image signal) output from the scanner 301, such as analog-to-digital conversion, shading compensation, binarization, and so on.

The compressor 303 carries out bit compression of image data received from the processor 302 or image data received from the expander 308 (the latter being data once stored in the memory 804 at the image scanning time, without being transmitted to a receiving facsimile machine, and read from the memory 304 and subjected to the bit expansion for transmission at night when the rates of telephone charges are low).

The memory 304 stores bit compressed image data not to be transmitted immediately through the telephone circuit, and image data to be reproduced on recording paper.

The transmission controller 304 controls transmission to the telephone circuit of image data received from the compressor 303 or memory 304, and storage in the memory 304 of image data received from the circuit connector 306 (i.e. data received through the telephone circuit).

The circuit connector 306 is an interface between the public telephone circuit and this facsimile machine The expander 308 carries out bit expansion of the image data stored in the memory 304 (i.e. the image data having undergone the bit compression).

The recorder 307 controls the operation of the image recording section. More particularly, as shown in FIG. 6, the recorder 307 includes a CPU which receives detection signals from a group of sensors (including the sensor 151 for detecting the discharge tray 107 in the home position), and control signals (such as commands for setting and canceling the shift mode) from the overall controller 310. In response to these signals, the CPU drives the various loads of the recording section (such as paper feed and transport motors, a paper feed clutch, the laser, developing device, fixing device, chargers, and so on), for reproducing an image corresponding to the image data on the recording paper for discharge onto the tray 107. Further, the CPU drives the stepper motor 151 for shifting the tray 107.

The control display unit 309 carries out operations for accepting inputs made through the keys on the control panel shown in FIG. 4, and for turning on and off display elements on the control panel.

The overall controller 310 provides comprehensive controls for causing the respective components of the control circuit to operate in timed relations with one another.

Figure 8A:
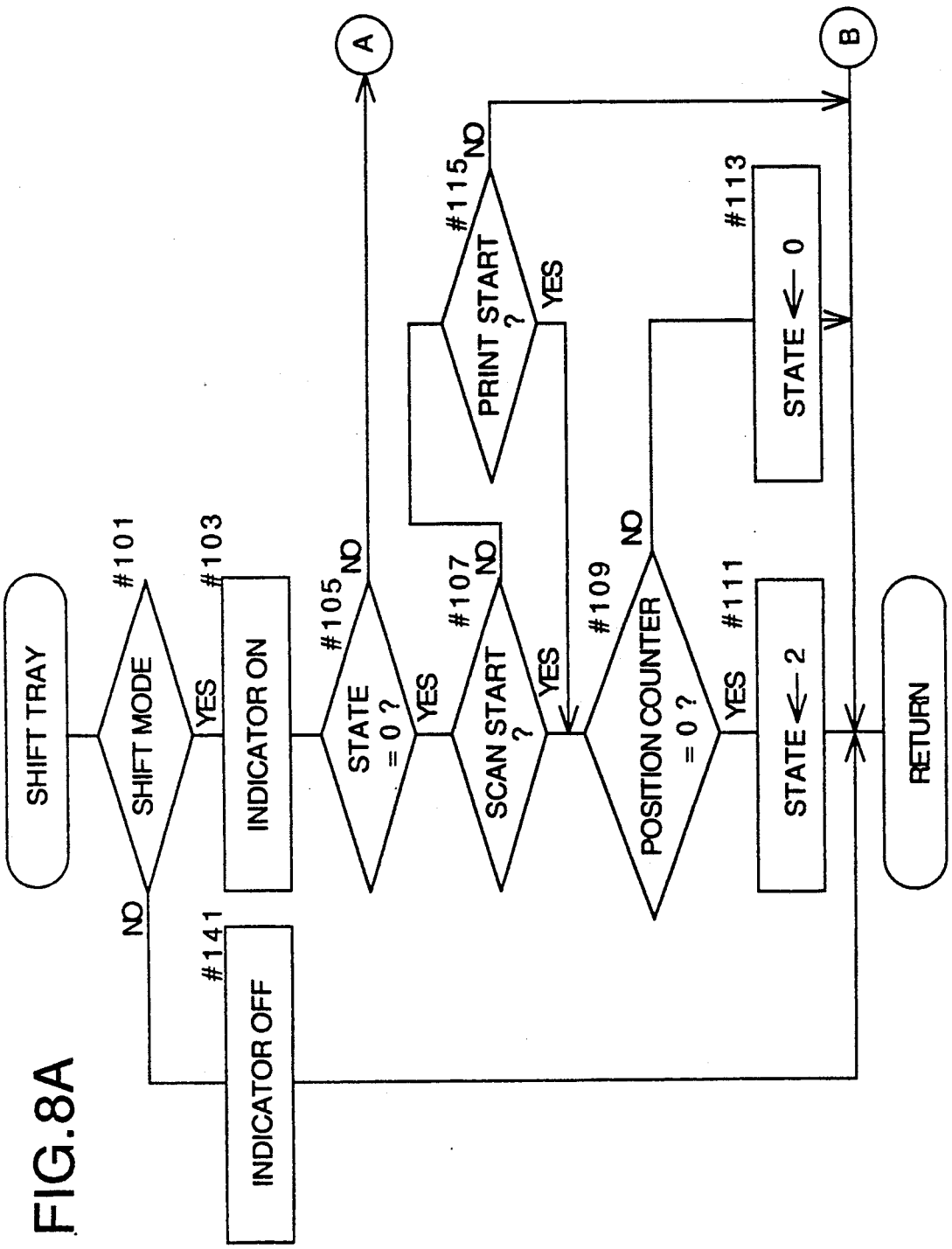
FIGS. 8A, 8B and 8C are a flowchart of a shift tray subroutine in FIG. 7, FIGS. 9A, 9B and 9C are a flowchart of a modification of the shift tray subroutine.
Figure 8B:
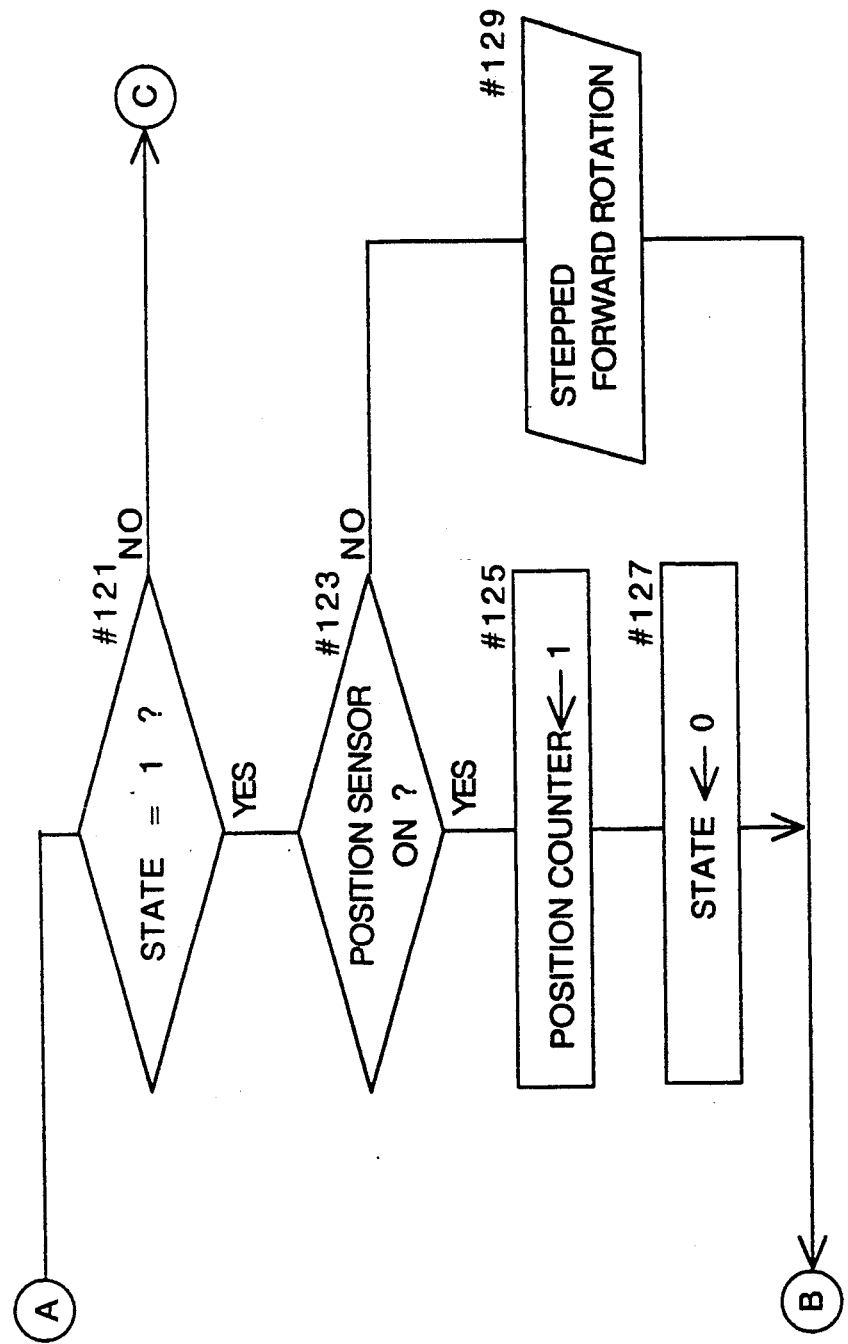
Figure 8C:
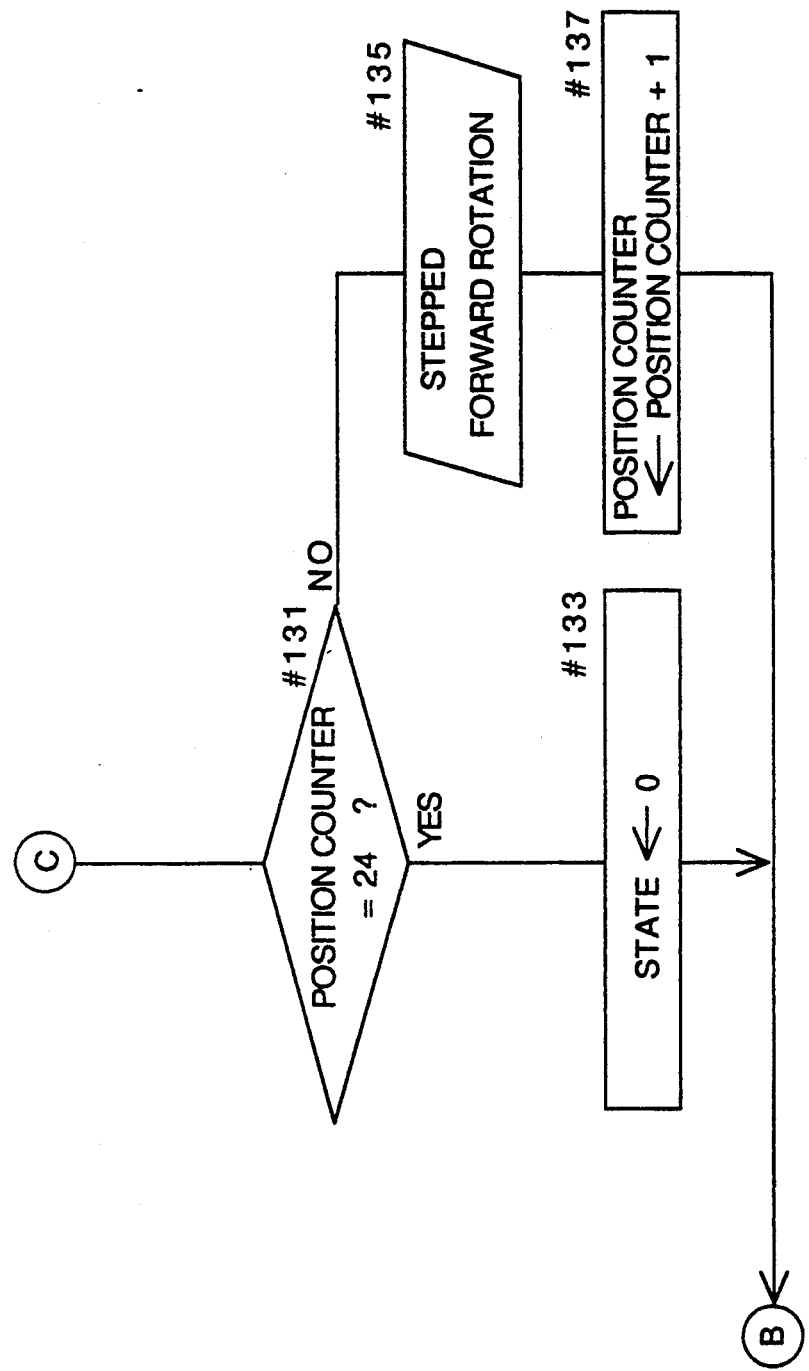

FIG. 7 is a flowchart of a main routine executed by the CPU of the recorder 307. FIGS. 8A through 8C are a flowchart of the processing carried out at step #11 (shift tray subroutine) in FIG. 7.

<1> Main Routine

The CPU for controlling the recording section starts its processing operation upon receipt of data from a different facsimile machine, for example.

At step #1 initialization is effected, and at step #3 an internal timer for determining a period of time for one routine is started. The value of the internal timer is set at step #1.

Subsequently, an image forming subroutine (a routine for controlling the laser, chargers, developing device, photoreceptor drum and so on) is executed at step #5, a paper feed subroutine (a routine for controlling the paper feed and transport motors, paper feed clutch and so on to feed and discharge the recording paper) at step #7, a fixation subroutine (a routine for controlling the fixing device) at step #9, and the shift tray subroutine (a routine for shifting the recording paper on the tray, which will be described later) at step #11. After waiting for the internal timer to expire at step #13, the program returns to step #3 and repeats the above subroutines.

<2> Shift Tray Subroutine (#11)

The shift tray subroutine executed at step #11 will be described next.

(i) Mode Determination

It is determined at step #101 whether the shift mode is selected or not. If it is, the shift mode indicator 216 is turned on at step #103. If not, the indicator 216 is turned off at step #141, and the program returns to the main routine.

(ii) Processing in Shift Mode

When the shift mode is selected, the program moves to #105 for carrying out processing in accordance of a state value. The state is initially set to zero.

a: When State is Zero ("Yes" at Step #105)

In this case, the program waits for start of a document scanning operation for image transmission (step #107) or an image recording operation resulting from receipt of a communication (step #115).

Upon start of either operation, the program moves to step #109 for checking the count of the position counter indicating the position of discharge tray 107. When the position counter shows zero, the slot of the tray 107 is at the solid line position or a first position in FIG. 3A. When the position counter shows "24", the slot of the tray 107 is at the broken line position or a second position in FIG. 3A.

If step #109 finds the position counter showing zero, that is if the tray 107 is in the first position (lower left-hand position in FIG. 2), the program moves to step #111 for setting the state to "2" and then executes steps #131 through #137 for shifting the tray 107 to the second position, which will be described later.

If step #109 finds the position counter not showing zero, that is if the tray 107 is not in the first position, the program moves to step #113 for setting the state to "1" and then executes steps #121 through #129 for shifting the tray 107 to the first position, which will also be described later.

b: When State is "1" ("Yes" at Step #121)

In this case, the processing is carried out for moving the tray 107 to the first position.

First, the stepper motor 150 is rotated forward step by step to shift the tray 107 leftward and downward in FIG. 2 (leftward in FIG. 3A) until the tray 107 reaches the first position and the home position sensor 151 turns on (steps #123 and #129).

When the tray 107 reaches the first position and the home position sensor 151 turns on ("Yes" at step #123), the position counter is set to zero at step #125.

Subsequently, the state is set to zero at step #127, and the program waits for start of a scanning operation for image transmission (step #107) or a recording operation resulting from receipt of a communication (step #115).

c: When State is "2" ("No" at Step #121)

In this case, processing is carried out for moving the tray 107 to the second position.

First, the stepper motor 150 is rotated forward step by step to increment the position counter with each step until the tray 107 reaches the second position and the position counter shows "24" (steps #131, #135 and #137). As a result, the tray 107 is shifted rightward and upward in FIG. 2 (rightward in FIG. 3A).

When the tray 107 reaches the second position and the position counter shows "24" ("Yes" at step #131), the state is set to zero at step #131, and the program waits for start of a scanning operation for image transmission (step #107) or a recording operation resulting from receipt of a communication (step #115).

In this way, the tray shift subroutine controls the positions of tray 107, whereby the tray 107 is shifted from one position (first or second position) to the other before original documents or sheets of recording paper are discharged as a result of data communication.

In the described first embodiment, the discharge tray 107 is shifted in directions perpendicular to the direction of discharge. Instead, the tray 107 may be shifted in directions parallel to the direction of discharge. Further, the tray 107 may be adapted for circular movement instead of the linear movement.

Two modifications of the shift tray subroutine executed at step #11 in FIG. 7 will be described next with reference to FIGS. 9A through 10E.

<3> Shift Tray Subroutine (Step #11)

A first modification will be described hereunder.

Figure 9A:
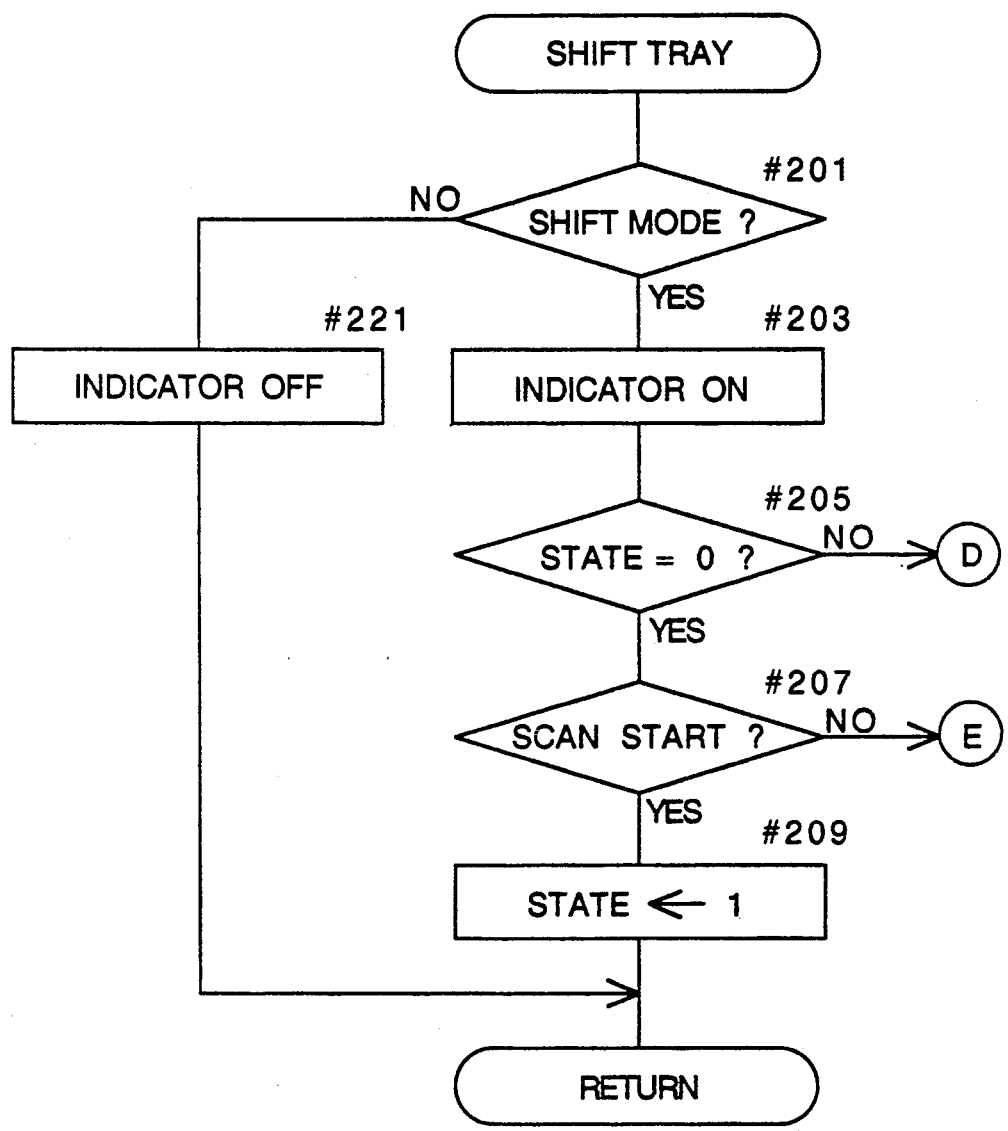
Figure 9B:
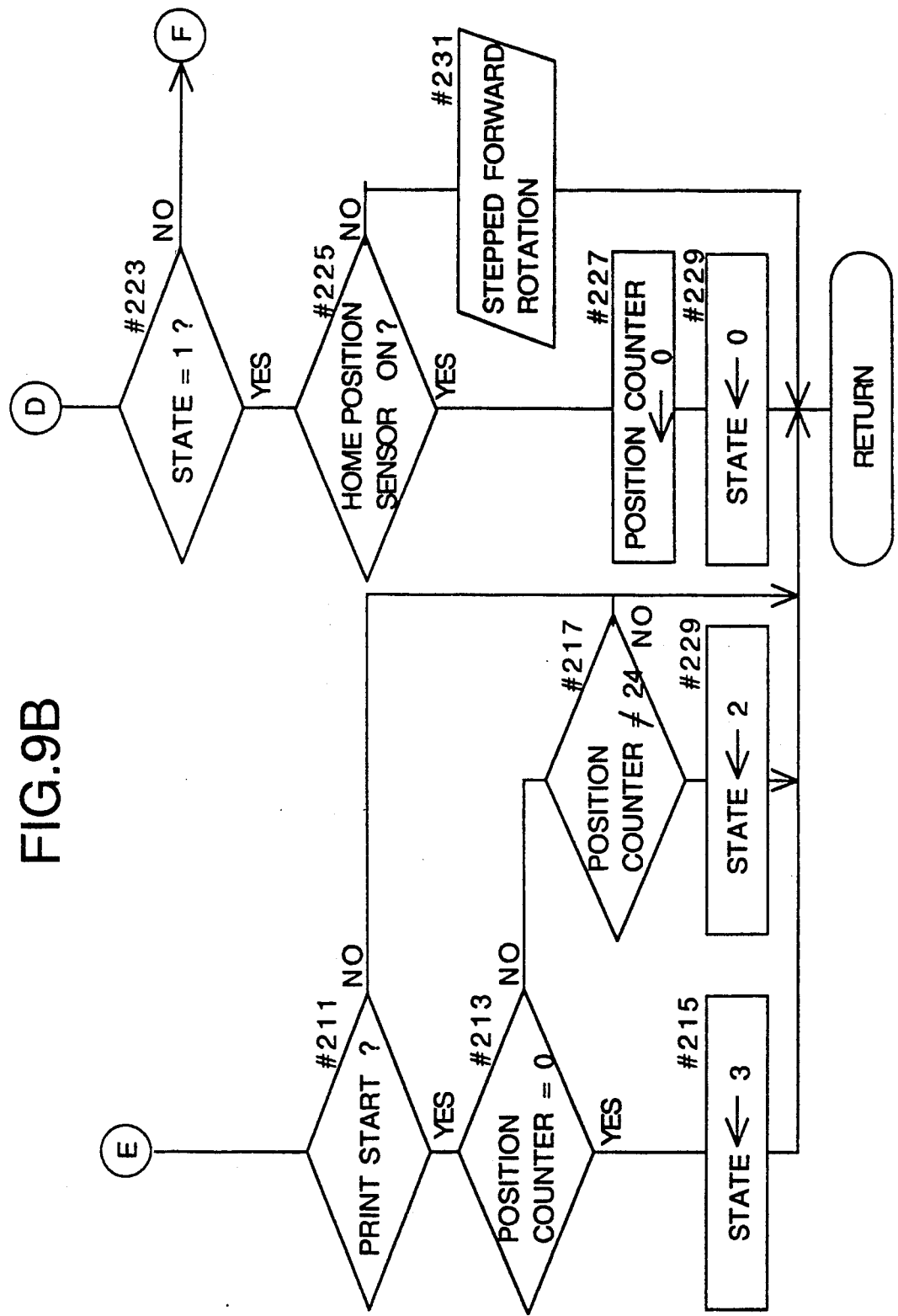
Figure 10A:
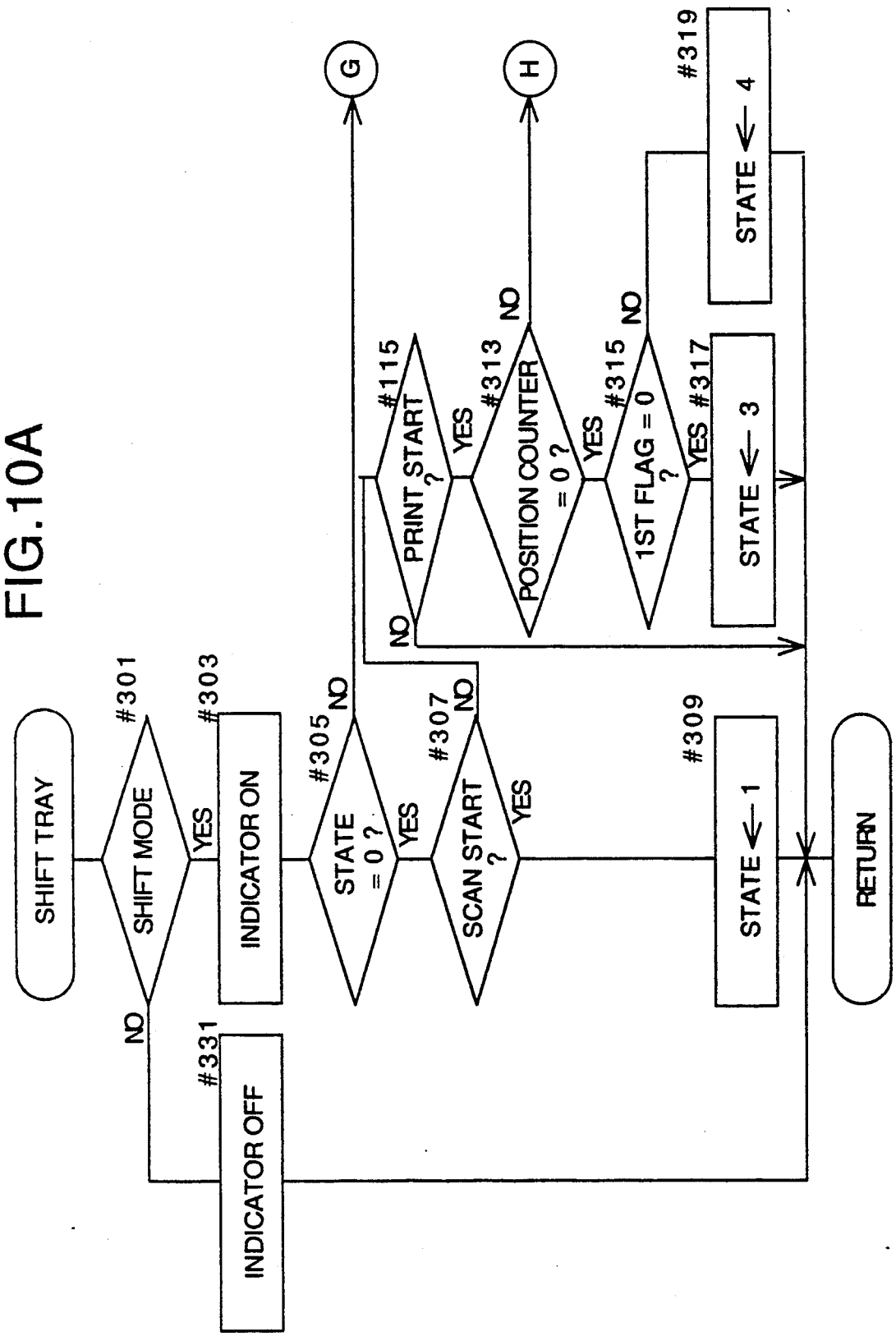
Figure 10B:
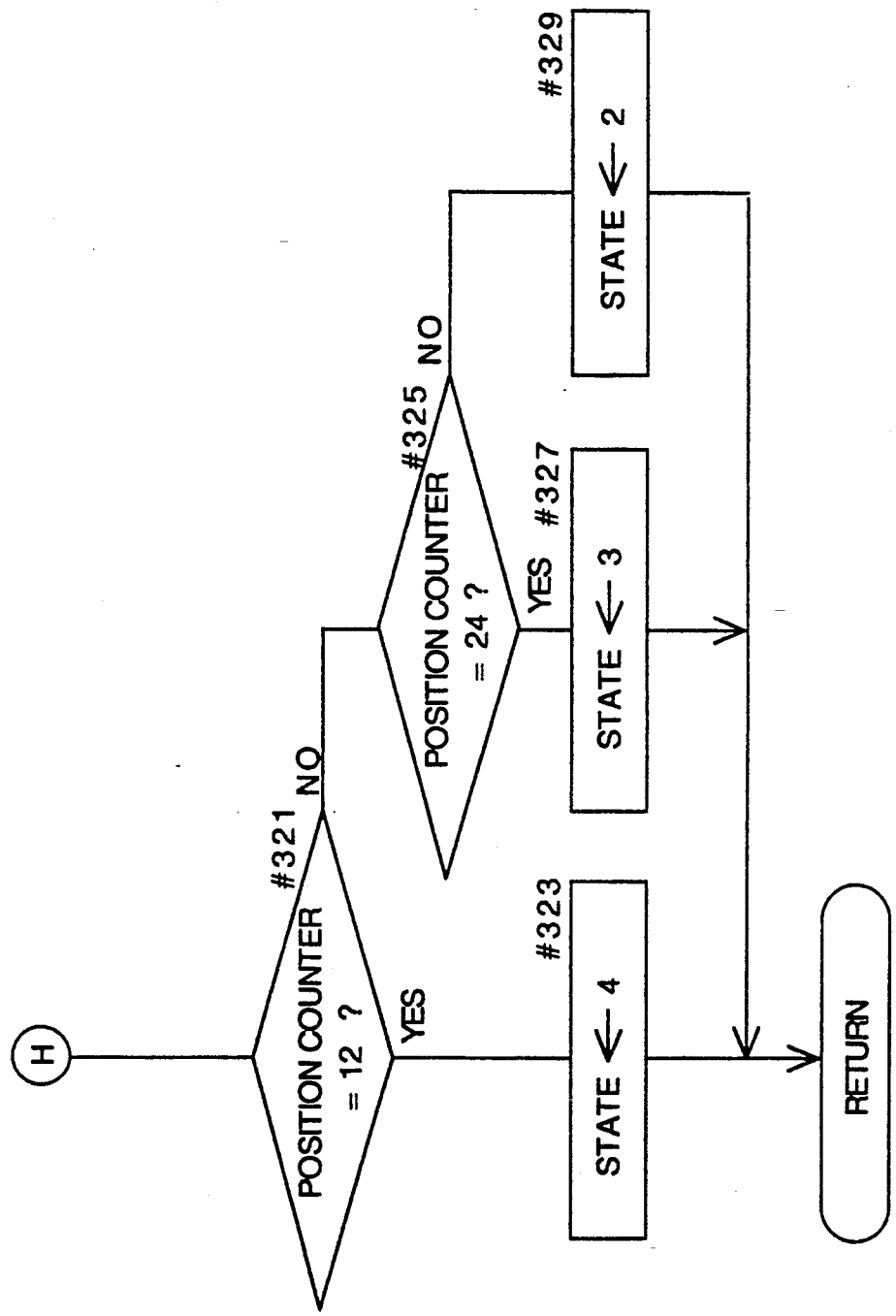
Figure 10C:
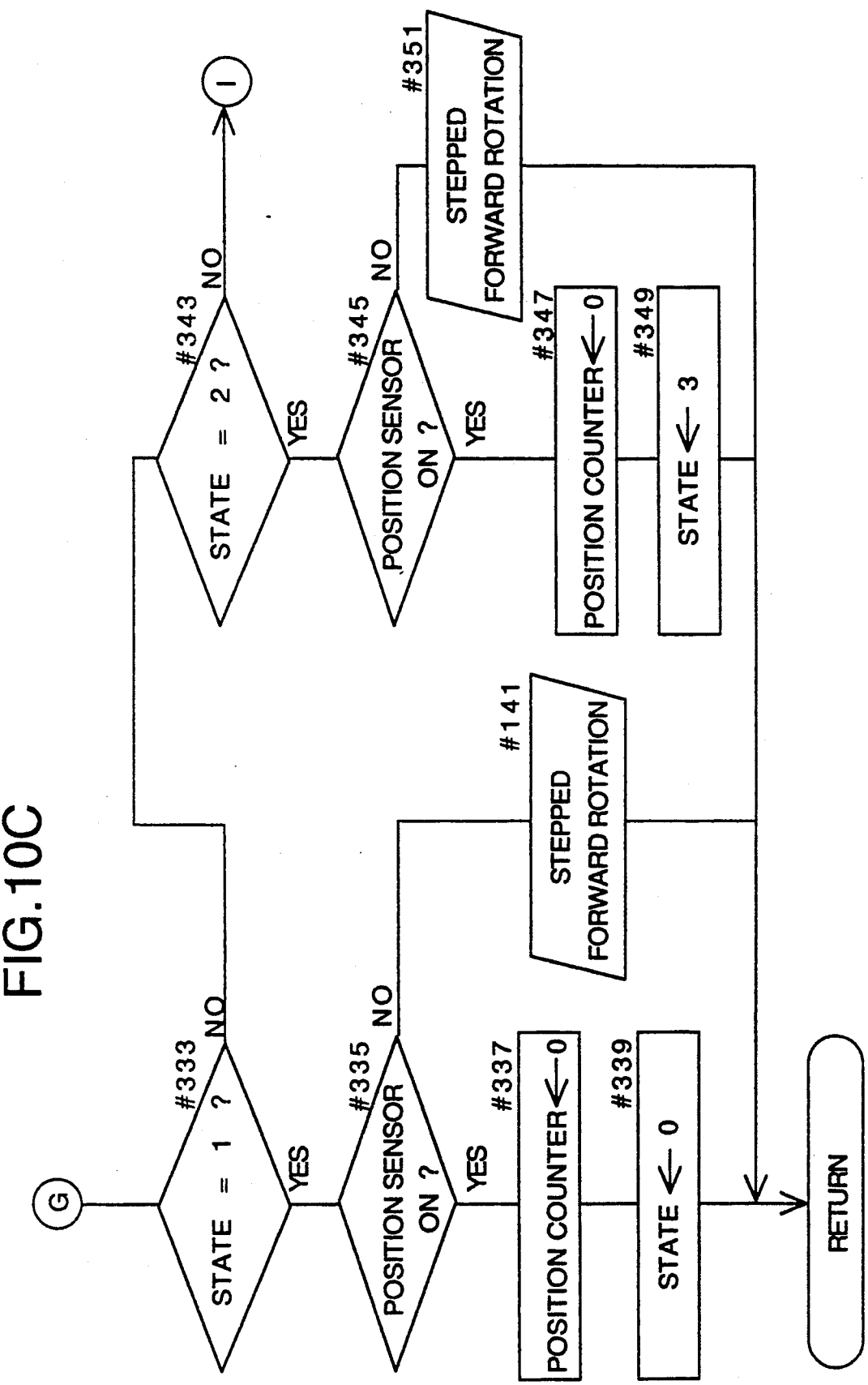
Figure 10E:
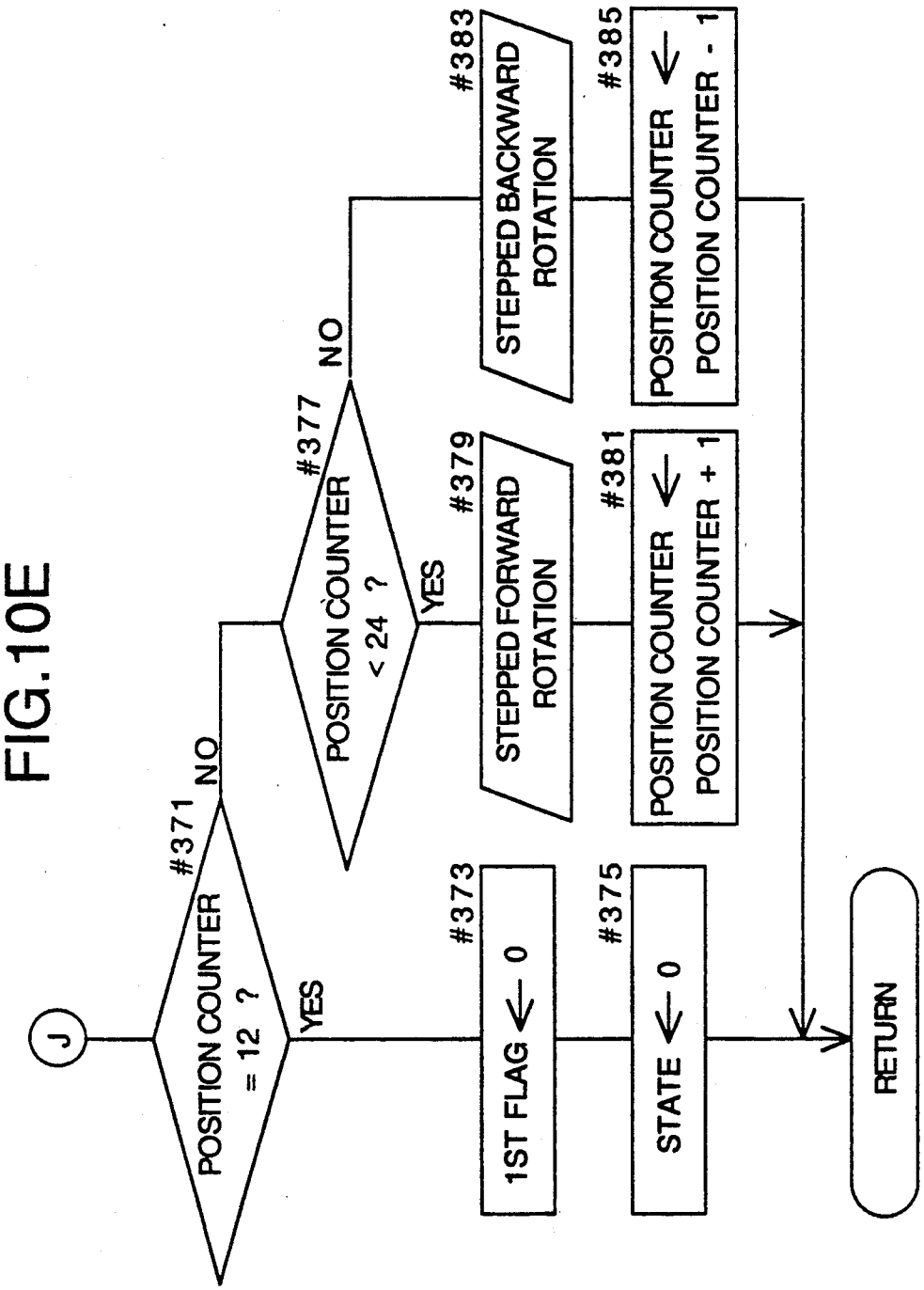

(i) Referring to FIGS. 9A through 9C, it is determined at step #201 whether the shift mode is selected or not. If it is, the shift mode indicator 216 is turned on at step #203. If not, the indicator 216 is turned off at step #221, and the program returns to the main routine.

The program moves from step #203 to #205 for carrying out processing in accordance of a state value. The state is initially set to zero.

(ii) When State is Zero ("Yes" at Step #205)

In the state is zero, the program waits for start of a document scanning operation for image transmission (step #207) or an image recording operation resulting from receipt of a communication (step #211).

When a document scanning operation is started, the program moves from step #207 to step #209 for setting the state to "1", and returns to the main routine. Consequently, when this subroutine is executed next time, processing is carried out for shifting the discharge tray 107 to a document collecting position.

When an operation for recording received image is started, the program moves from step #211 to step #213 for checking the count of the position counter. The position counter is initially set to a count other than "0" and "24". This counter is indicative of the number of steps taken by the stepper motor. Count "0" of the position counter corresponds to the document collecting position of the discharge tray 107 (the home position shown in the solid line in FIG. 3A). Count "24" of the position counter corresponds to a recording paper collecting position of the discharge tray 107 (the position shown in the broken line in FIG. 3A).

If the position counter shows "0" ("Yes" at step #213), the program moves to step #215 for setting the state to "3" to rotate the stepper motor 180 degrees, and returns to the main routine. Consequently, when this subroutine is executed next time, processing is carried out for shifting the discharge tray 107 to the recording paper collecting position.

If the position counter shows "24" ("No" at step #217), the program just returns to the main routine since the discharge tray 107 is already in the recording paper collecting position.

If the position counter shows neither "0" nor "24" ("Yes" at step #217), the program moves to step #219 for setting the state to "2", and returns to the main routine. Consequently, when this subroutine is executed next time, processing is carried out for returning the discharge tray 107 to the home position.

(iii) When State is "1" ("Yes" at Step #223)

When the state is "1", the processing is carried out for shifting the discharge tray 107 to the document collecting position (the home position shown in the solid line in FIG. 3A).

More particularly, the stepper motor 150 is rotated forward step by step until the home position sensor 151 turns on (steps #225 and #231). When the tray 107 reaches the home position and the home position sensor 151 turns on ("Yes" at step #225), the position counter is set to zero at step #227 and the state is set to zero at step #229.

(iv) When State is "2" ("Yes" at Step #235)

When the state is "2", the processing is carried out for returning the discharge tray 107 to the document collecting position (the home position).

More particularly, the stepper motor 150 is rotated forward step by step until the home position sensor 151 turns on (steps #237 and #243). When the tray 107 reaches the home position and the home position sensor 151 turns on ("Yes" at step #237), the position counter is set to zero at step #239 and the state is set to "3" at step #229. Thereafter, the processing is carried out for shifting the discharge tray 107 to the recording paper collecting position as hereinafter described.

(v) When State is "3" ("No" at Step #235)

When the state is "3", the stepper motor 150 is rotated forward step by step and the position counter is incremented one by one until the latter shows "24" (steps #245, #249 and #251). When the discharge tray 107 reaches the recording paper collecting position and position counter shows "24", ("Yes" at step #245), the state is set to zero at step #247.

<4> Shift Tray Subroutine (Step #11)

A second modification will be described hereunder.

(i) Referring to FIGS. 9A through 9C, it is determined a step #301 whether the shift mode is selected or not. If it is, the shift mode indicator 216 is turned on at step 190 303. If not, the indicator 216 is turned off at step #331, and the program returns to the main routine.

The program moves from step #303 to #305 for carrying out processing in accordance of a state value. The state is initially set to zero.

(ii) When State is Zero ("Yes" at Step #305)

In the state is zero, the program waits for start of a document scanning operation for image transmission (step #307) or an image recording operation resulting from receipt of a communication (step #311).

When a document scanning operation is started, the program moves from step #307 to step #309 for setting the state to "1", and returns to the main routine. Consequently, when this subroutine is executed next time, processing is carried out for shifting the discharge tray 107 to the document collecting position.

When an operation for recording received image is started, the program moves from step #311 to step #313 for checking the count of the position counter. The position counter is indicative of the number of steps taken by the stepper motor, and is initially set to a count other than "0", "12" and "24". Count "0" of the position counter corresponds to the document collecting position of the discharge tray 107 (the home position shown in a solid line in FIG. 3B). Count "12" of the position counter corresponds to a first recording paper collecting position of the discharge tray 107 (the position shown in a dot and dash line in FIG. 3B). Count "24" of the position counter corresponds to a second recording paper collecting position of the discharge tray 107 (the position shown in a broken line in FIG. 3B).

If the position counter shows "0" ("Yes" at step #313), the program moves to step #315 for checking a first flag. If the first flag shows "0", the program moves to step #317 for setting the state to "2". If the first flag shows "1", the program moves to step #319 for setting the state to "4". Then the program returns to the main routine. The first flag is a flag which, as described later, is set to "1" when the position counter reaches "12", that is when the discharge tray 107 reaches the first recording paper collecting position.

If the position counter shows "12" ("Yes" at step #321). the program moves to step #321 for setting the state to "4" and returns to the main routine.

If the position counter shows "24" ("Yes" at step #325), the program moves to step #327 for setting the state to #3" and returns to the main routine.

If the position counter shows a count other than "0", "12" and "24" ("No" at step #325), the program moves to step #329 for setting the state to "2", and returns to the main routine.

iii) When State is "1" ("Yes" at Step #333)

When the state is "1", the processing is carried out for shifting the discharge tray 107 to the home position. More particularly the stepper motor 150 is rotated forward step by step until the home position sensor 151 turns on (steps #341). When the tray 107 reaches the home position and the home position sensor 151 turns on ("Yes" at step #335), the position counter and the state are set to zero at steps #337 and #339.

(iv) When State is "2" ("Yes" at Step #345)

When the state is "2", the processing is first carried out for returning the discharge tray 107 to the home position. More particularly, the stepper motor 150 is rotated forward step by step until the home position sensor 151 turns on (steps #345 and #351). When the tray 107 reaches the home position and the home position sensor 151 turns on ("Yes" at step #345), the position counter is set to zero at step #347 and the state is set to "3" at step #349. Then the program returns to the main routine.

(v) When State is "3" ("Yes" at Step #353)

When the state is "3", processing is carried out for shifting the discharge tray 107 to the first recording paper collecting position. For this purpose, the stepper motor 150 is rotated forward or backward until the position counter reaches "12".

The position counter is checked first. If the position counter shows a count less than "12" ("Yes" at step #361), the stepper motor 150 is rotated forward step by step at step #363 and the position counter is incremented one by one at step #365.

If the position counter shows a count greater than "12" ("No" at step #361), the stepper motor 150 is rotated backward step by step at step #367 and the position counter is decremented one by one at step #369.

When the position counter reaches "12" as a result of the incrementing or decrementing operation ("Yes" at step #355), the program moves to step #357 for setting the first flag to "1" and to step #359 for setting the state to "0". Then the program returns to the main routine.

(vi) When State is "4" ("No" at Step #353)

When the state is "4", processing is carried out for shifting the discharge tray 107 to the second recording paper collecting position. For this purpose, the stepper motor 150 is rotated forward or backward until the position counter reaches "24".

The position counter is checked first. If the position counter shows a count less than "24" ("Yes" at step #377), the stepper motor 150 is rotated forward step by step at step #379 and the position counter is incremented one by one at step #381.

If the position counter shows a count greater than "24" ("No" at step #377), the stepper motor 150 is rotated backward step by step at step #383 and the position counter is decremented one by one at step #385.

When the position counter reaches "24" as a result of this incrementing or decrementing operation ("Yes" at step #371), the program moves to steps #373 and #375 for setting the first flag and the state to "0". Then the program returns to the main routine.

This shift subroutine is executed as described above.

In this embodiment, the document discharging position corresponds to the left end position and the recording paper discharging positions to the intermediate and right end positions in FIG. 3B. However, the present invention is not limited to such positional arrangement.

The recording paper may be discharged to three or more positions.

An image forming apparatus according to a second embodiment of the invention will be described hereinafter.

The facsimile machine shown in FIG. 1 may be used as a copying machine, in which case the image data of document 123 read by the scanner 301 shown in FIG. 5 is stored in the memory 304, the image data being subsequently output from the memory 304 through the expander 308 to the recorder 307.

FIG. 11 is an explanatory view of a control panel of this image forming apparatus, which is provided as a replacement for the control panel 200 shown in FIG. 4.

As shown, the control panel 200' includes a group of numeric keys 201'-210' for designating the number of a facsimile machine to be called, function keys 211' and 212' for adding various functions in combination with other keys, a start key 213' for starting an image transmission or a copying operation, a stop key 214' for discontinuing an image transmission, a shift key 215' for setting and canceling a mode (shift mode) for shifting recording paper on the discharge tray, a shift indicator 216' which is lit for indicating that the shift mode is selected, a copy key 218' for setting and canceling a copy mode, a copy mode indicator 219' which is lit for indicating that the copy mode is selected, and a liquid crystal display 217' for displaying an operating sequence of this facsimile machine.

The way in which the machine operates in the copy mode will be described now.

As in the flowchart of the first embodiment shown in FIG. 7, the CPU for controlling the recording section starts its processing when the start key 213' is pressed following selection of the copy mode.

Figure 12:
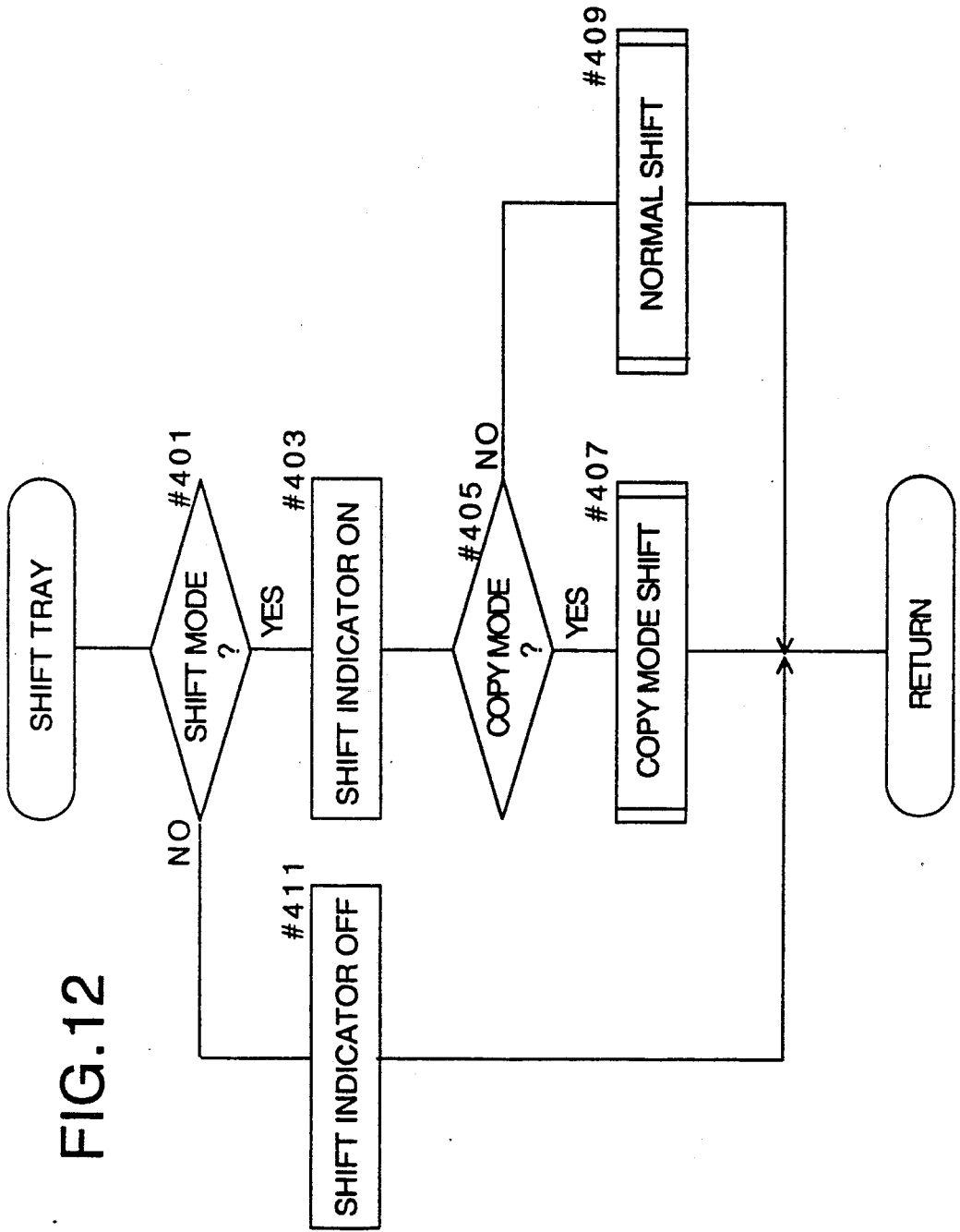
FIG. 12 is a flowchart of a shift tray subroutine according to the second embodiment.
Figure 13B:
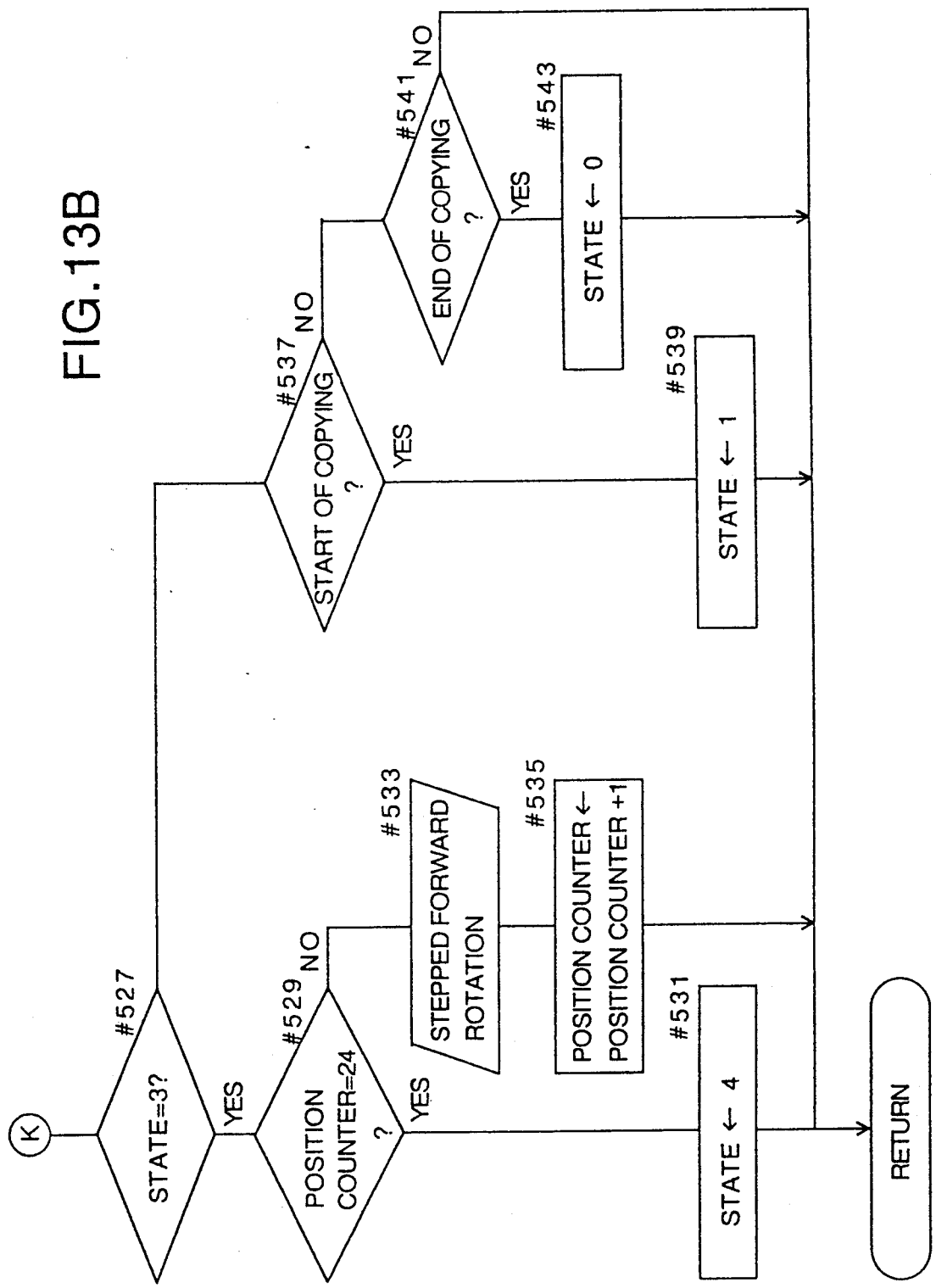

The shift tray subroutine is executed at step #51 as shown in FIGS. 12, 13A and 13B.

It is determined at step #401 whether the shift mode is selected or not. If it is, the shift mode indicator 216' is turned on at step #403. If not, the indicator 216' is turned off at step #411, and the program returns to the main routine.

The program moves from step #403 to step #405 for checking whether the copy mode (a mode in which the facsimile machine is used as a copying machine) is selected or not. It is, step #507 is taken for shifting the discharge tray 107 in the copying mode. If not, step #409 is taken for shifting the tray 107 in a normal mode (a mode for a normal image communication with a different facsimile machine).

The shift tray processing in the copy mode will be described hereinafter. The tray shift in the normal mode is effect for each communication, for example, which does not form the gist of this invention and is not described herein.

<3> Shift processing in Copy Mode (Step #407)

In the shift processing in the copy mode, sorting is carried out in the order of the original document, a first copy, a second copy, and an nth copy in accordance with state values as follows:

(i) When State is Zero

When the state is zero ("Yes" at step #501), the program waits for start of a document scanning operation. Upon start of a scanning operation ("Yes" at step #503), the program moves to step #505 for setting the state to "1" and returns to the shift tray routine. The state is initially set to zero.

(ii) When State is "1"

When the state is "1" ("Yes" at step #507), the processing is carried out for shifting the tray 107 to the first position (the home position shown in the solid line in FIG. 3A). The first position is a position for discharging the documents and the copies taken for even numbered sets.

First, the stepper motor 150 is rotated forward step by step at step #515 until the home position sensor 151 turns on (step #515). When the home position sensor 151 turns on ("Yes" at step =502), the position counter is set to zero at step #511. Subsequently, the state is set to "2" at step #513, and the program returns to the shift tray routine.

(iii) When State is "2"

When the state is "2" ("Yes" at step #517), the program waits for start or finish of an image recording operation.

When start of an image recording operation is detected (i.e. when a first copy is taken for an odd-numbered set) at step #519, the program moves to step #521 for setting the state to "3" and returns to the shift tray routine.

When an operation for recording a final copy for a final set is completed ("Yes" at step #523), the program moves to step #525 for setting the state to zero, and returns to the shift tray routine.

(iv) When State is "3"

When the state is "3" ("Yes" at step #527), processing is carried out for shifting the discharge tray 107 to the second position (the position shown in the broken line in FIG. 3A). The second position is a position for discharging the copies taken for odd-numbered sets.

First, the stepper motor 150 is rotated forward step by step at step #515 (step #533), and the position counter is incremented one by one (step #535) until the latter reaches "24".

When the position counter reaches "24" ("Yes" at step #529), the program moves to step #531 for setting the state to "4", and returns to the shift tray routine.

(v) When the State is "4"

When the state is "4" ("No" at step #527), the program waits for start or finish of an image recording operation.

When start of an image recording operation is detected (i.e. when a first copy is taken for an even-numbered set) at step #537, the program moves to step #539 for setting the state to "1" and returns to the shift tray routine.

When an operation for recording a final copy for a final set is completed ("Yes" at step =541), the program moves to step #543 for setting the state to zero, and returns to the shift tray routine.

The tray is shifted as described above.

In the above embodiment, sorting is carried out not only between documents and copies, but also between first copies, second copies and so on by shifting the discharge tray when plural sets of copies are taken. Thus, manual sorting of the copies is not required.

As shown in FIG. 14, for example, the following steps are taken for copying a series of 10 documents D1-D10 ten times each to obtain 10 series of copies S1-S10:

(i) Set documents D1-D10 to the document tray 117 shown in FIG. 1.

(ii) Select the copy mode by pressing the copy mode key 218 on the control panel 200', select the desired number of copies through the numeric keys, and press the start key 213.

(iii) In response to the start key operation, the images of documents D1-D10 are read one after another, and image data M1-M10 of the ten documents are stored in the memory 304. The documents having been copied are discharged onto the tray 107 in the first position.

(iv) A recording operation is automatically started when the image data M1-M10 have been stored in the memory 304. Then the image data M1-M10 are successively read from the memory 304 for recording on the recording paper. This operation is repeated ten times. Each time recording of the series of image data M1-M10 is completed, the tray 107 is switched between the first position and the second position. Consequently, the respective series of copies C1-C10 of the series of documents D1-D10 are placed in a sorted manner on different positions within the tray 107.

In this embodiment, the discharge tray 107 is shifted in directions perpendicular to the direction of discharge. Instead, the tray 107 may be shifted in directions parallel to the direction of discharge. Further, the tray 107 may be adapted for circular movement instead of the linear movement.

Further, although this embodiment provides two tray stopping positions, the tray may be stopped at three or more positions.

The present invention has been described in relation to facsimile machines, but the invention is applicable to other types of image forming apparatus having a copying function in which a discharge tray is shared by original documents and recording paper.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A facsimile apparatus comprising;
a document table for supporting a plurality of original documents;
image reader means for reading image information of the original documents;
transmission means for transmitting the image information of the original documents read by said image reader means through a communication line;
image forming means for recording image data received through the communication line on recording paper;
recording paper storage means for storing the recording paper used for recording by said image forming means;
common storage means for storing the original documents having been read in a first location therein and the recording paper having been recorded in a second location therein varied from said first location;
first transport means for transporting the original documents successively from said document table through said image reader means to said common storage means;
second transport means for transporting the recording paper from said recording paper storage means through said image forming means to said common storage means;
switch means for switching said common storage means between a first position for storing the original documents having been read in the first location therein and a second position for storing the recording paper having been recorded in the second location therein; and
control means for actuating said switch means in response to each of the operations for reading the image information of each series of original documents and for forming images on each series of recording paper.

2. A facsimile apparatus as claimed in claim 1, wherein said common storage means includes a common tray reciprocable between said first position and said second position, and said switch means includes a mechanism for shifting said common tray between said first position and said second position.

3. A facsimile apparatus as claimed in claim 1, wherein said document table, said common storage means and said recording paper storage means are arranged vertically in the mentioned order.

4. A facsimile apparatus as claimed in claim 3, wherein said image reader means is disposed between said document table and said common storage means.

5. A facsimile apparatus as claimed in claim 3, wherein said image forming means is disposed between said common storage means and said recording paper storage means.

6. A facsimile apparatus comprising:
a document table for supporting a plurality of original documents;
image reader means for reading image information of the original documents;
transmission means for transmitting the image information of the original documents read by said image reader means through a communication line;
image forming means for recording image data received through the communication line on recording paper;
recording paper storage means for storing the recording paper used for recording by said image forming means;
common storage means for storing the original documents having been read in a first location therein and the recording paper having been recorded in a second location therein varied from said first location;
first transport means for transporting the original documents successively from said document table through said image reader means to said common storage means;
second transport means for transporting the recording paper from said recording paper storage means through said image forming means to said common storage means; and
control means for controlling said common storage means to receive the original documents having been read in said first location therein, and to receive the recording paper having been recorded in said second location therein.

7. A facsimile apparatus as claimed in claim 6, wherein said common storage means includes a common tray reciprocable between a first position for receiving the original documents having been read in the first location therein and a second position for receiving the recording paper having been recorded in the second location therein, said control means including a mechanism for shifting said common tray between said first position and said second position.

8. A facsimile apparatus as claimed in claim 6, wherein said document table, said common storage means and said recording paper storage means are arranged vertically in the mentioned order.

9. A facsimile apparatus as claimed in claim 8, wherein said image reader means is disposed between said document table and said common storage means.

10. A facsimile apparatus as claimed in claim 8, wherein said image forming means is disposed between said common storage means and said recording paper storage means.

11. A facsimile apparatus comprising:
a document table for supporting a plurality of documents;
image reader means for reading image information of the documents;
transmission means for transmitting the image information of the documents read by said image reader means through a communication line;
image forming means for recording image data received through the communication line on recording paper;
recording paper storage means for storing the recording paper used for recording by said image forming means;
common storage means for storing the documents having been read in a first location therein and the recording paper having been recorded in second and third locations therein varied from said first location;
first transport means for transporting the documents successively from said document table through said image reader means to said common storage means;
second transport means for transporting the recording paper from said recording paper storage means through said image forming means to said common storage means;
switch means for switching said common storage means among a first position for storing the documents having been read in the first location therein, and a second position and a third position for storing the recording paper having been recorded in the second and third locations, respectively; and
control means for actuating said switch means to switch said common storage means among said first, second and third positions to receive the documents having been read, in said first location, and to receive the recording paper having been recorded in different image forming operations in said second and third locations, respectively.

12. A facsimile apparatus as claimed in claim 11, wherein said control means is operable for actuating said switch means to switch said common storage means to receive, in said second and third locations, a series of recording paper carrying images formed in a preceding image forming operation and a series of recording paper carrying images formed in a new image forming operation, respectively.

13. A facsimile apparatus as claimed in claim 12, wherein said common storage means includes a common tray reciprocable among said first position, said second position and said third position, and wherein said switch means includes a mechanism for shifting said common tray between said first position, said second position and said third position.

14. A facsimile apparatus as claimed in claim 12, wherein said document table, said common storage means and said recording paper storage mans are arranged vertically in the mentioned order.

15. A facsimile apparatus as claimed in claim 14, wherein said image reader means is disposed between said document table and said common storage means.

16. A facsimile apparatus as claimed in claim 14, wherein said image forming means is disposed between said common storage means and said recording paper storage means.

17. An image forming apparatus comprising:
a document table for supporting a series of original documents;
image reader means for reading image information of the series of original documents;
memory means for storing the image information of the series of original documents read by said image reader means through a communication line;
image forming means for carrying out a selected number of times an operation for successively recording the image information of the series of original documents stored in said memory means on recording paper;

recording paper storage means for storing the recording paper used for recording by said image forming means;

common storage means for storing the original documents having been read in a first location therein and the recording paper having been recorded in a second location therein varied from said first location;

first transport means for transporting the original documents successively from said document table through said image reader means to said common storage means;

second transport means for transporting the recording paper from said recording paper storage means through said image forming means to said common storage means;

switch means for switching said common storage means between a first position for storing the original documents having been read in the first location therein and a second position for storing the recording paper having been recorded in the second location therein; and control means for actuating said switch means in response to each of operations for reading the image information of each series of original documents and for forming images on each series of recording paper.

18. An image forming apparatus as claimed in claim 17, wherein said common storage means includes a common tray reciprocable between said first position and said second position, and wherein said switch means includes a mechanism for shifting said common tray between said first position and said second position.

19. An image forming apparatus as claimed in claim 17, wherein said document table, said common storage means and said recording paper storage means are arranged vertically in the mentioned order.

20. An image forming apparatus as claimed in claim 19, wherein said image reader means is disposed between said document table and said common storage means.

21. An image forming apparatus as claimed in claim 19, wherein said image forming means is disposed between said common storage means and said recording paper storage means.

22. An image forming apparatus comprising:

means for supporting original documents to be read;

image reader means for reading image information carried on the original documents;

means for storing recording paper to be recorded;

image forming means for recording image information onto said recording paper;

common storage means for storing the original documents having been read in a first location therein and for storing the recording paper having been recorded in a second location therein varied from said first location;

first transport means for transporting the original documents successively from said original document supporting means through said image reader means to said common storage means;

second transport means for transporting the recording paper from said recording paper storage means through said image forming means to said common storage means;

switch means for switching said common storage means between a first position for storing the original documents having been read in the first location therein and a second position for storing the recording paper having been recorded in the second location therein; and control means for actuating said switch means in response to each of operations for reading the image information on said original documents and for forming images on said recording paper.

* * * * *

UNITED STATES PATENT AND TRADEMARK OFFICE
CERTIFICATE OF CORRECTION

PATENT NO. : 5,173,785
DATED : December 22, 1992
INVENTOR(S) : Hideo Muramatsu It is certified that error appears in the above-identified patent and that said Letters Patent is hereby corrected as shown below:

```
In Col. 2, line 56, change "he" to --the--.
In Col. 3, line 5, change "SB" to --3B--.
In Col. 4, line 19, change "804" to --304--.
In Col. 7, line 57, change "a" to --at--.
In Col. 7, line 59, change "190 303" to --#303--.
In Col. 8, line 38, change "#3" to --"3"--.
In Col. 10, line 54, change "=502" to --#502--.
In Col. 11, line 26, change "=541" to --#541--.
```

Signed and Sealed this

Ninth Day of November, 1993

Attest:

BRUCE LEHMAN

*Attesting Officer*  *Commissioner of Patents and Trademarks*